US011968442B2

(12) United States Patent
Osuka et al.

(10) Patent No.: US 11,968,442 B2
(45) Date of Patent: Apr. 23, 2024

(54) IMAGING APPARATUS

(71) Applicant: Panasonic Intellectual Property Management Co., Ltd., Osaka (JP)

(72) Inventors: Kyosuke Osuka, Osaka (JP); Kazuya Abe, Osaka (JP); Yuichi Suzuki, Osaka (JP); Kunio Dohno, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 93 days.

(21) Appl. No.: 17/511,779

(22) Filed: Oct. 27, 2021

(65) Prior Publication Data

US 2022/0141391 A1 May 5, 2022

(30) Foreign Application Priority Data

Oct. 29, 2020 (JP) .................................. 2020-181625

(51) Int. Cl.
*H04N 23/63* (2023.01)
*G06F 3/06* (2006.01)

(52) U.S. Cl.
CPC ......... *H04N 23/631* (2023.01); *G06F 3/0605* (2013.01); *G06F 3/0643* (2013.01); *G06F 3/0685* (2013.01); *G06F 3/0688* (2013.01); *G06F 2206/1008* (2013.01)

(58) Field of Classification Search
CPC ........... G06F 2206/1008; G06F 3/0605; G06F 3/0643; G06F 3/0685; G06F 3/0688; G11B 27/105; G11B 27/327; H04N 23/631

See application file for complete search history.

(56) References Cited

U.S. PATENT DOCUMENTS

2006/0152600 A1* 7/2006 Hamada ............... H04N 1/2137
386/E5.072
2010/0302408 A1 12/2010 Ito
2011/0141307 A1 6/2011 Seto
2013/0142258 A1* 6/2013 Tsuihiji ............... G11B 27/322
375/240.12

(Continued)

FOREIGN PATENT DOCUMENTS

JP 2006-109176 A 4/2006
JP 2007-295070 A 11/2007

(Continued)

OTHER PUBLICATIONS

Japanese Office Action issued in JP Application No. 2020-181625, dated Feb. 1, 2021.

*Primary Examiner* — Antoinette T Spinks
(74) *Attorney, Agent, or Firm* — Renner, Otto, Boisselle & Sklar, LLP

(57) ABSTRACT

An imaging apparatus includes: an imager configured to capture a subject image to generate image data; a controller that records an image file based on the image data on the recording medium; and an operation interface that inputs a user operation for selecting a file system from first and second file systems different from each other, the file system managing the image file in the recording medium, wherein in accordance with the user operation input in the operation interface, the controller switches a folder for storing the image file between a first folder corresponding to the first file system and a second folder corresponding to the second file system in the recording medium.

11 Claims, 21 Drawing Sheets

(56) References Cited

U.S. PATENT DOCUMENTS

2014/0081976 A1* 3/2014 Mikawa .................. G06F 16/51
                                                                            707/737

FOREIGN PATENT DOCUMENTS

| JP | 2011-147119 A | 7/2011 |
| JP | 2017-12212 A | 1/2017 |
| WO | 2007/086197 A1 | 8/2007 |

* cited by examiner

Fig. 4A

| SPECIFICATION | DIRECTORY NUMBER | | | FREE CHARACTERS (5 ALPHANUMERICS) | | | | |
|---|---|---|---|---|---|---|---|---|
| EXAMPLE | 1 | 0 | 0 | _ | P | A | A | A |

Fig. 4B

| SPECIFICATION | FREE CHARACTERS (4 ALPHANUMERICS) | | | | FILE NUMBER | | | |
|---|---|---|---|---|---|---|---|---|
| EXAMPLE | P | 1 | 0 | 0 | 0 | 0 | 0 | 1 |

IMAGING APPARATUS

BACKGROUND

1. Technical Field

The present disclosure relates to an imaging apparatus that records an image file on a recording medium.

2. Related Art

JP 2006-109176 A discloses an imaging apparatus relates to recording image data supporting a plurality of data structures. A data recording structure used when the imaging apparatus of JP 2006-109176 A records data on a recording medium is a hierarchical data structure and includes a MEDIA directory and a DCIM directory. In the imaging apparatus of JP 2006-109176 A, the MEDIA directory and a subordinate directory thereof have a data structure conforming to a standard at which files of still images, moving images, and the like can be handled. The DCIM directory and a subordinate directory thereof have a structure conforming to the Design rule for Camera File system (DCF) standard that is widely known as a data structure for digital still cameras.

The imaging apparatus of JP 2006-109176 A records both a still image file and a moving image file in the subordinate directory of the MEDIA directory, and records link information to the still image file in the subordinate directory of the DCIM directory. This makes it possible to handle a still image file with a plurality of data structures while restraining consumption of the recording medium.

SUMMARY

The present disclosure provides an imaging apparatus that facilitates management of an image file according to a user's preference.

In the present disclosure, an imaging apparatus that records an image file on a recording medium includes an imager, a controller, and an operation interface. The imager captures a subject image to generate image data. The control unit records an image file based on the image data on the recording medium. The operation interface inputs a user operation for selecting a file system from first and second file systems different from each other. The file system is for managing the image file in the recording medium. In accordance with the user operation input in the operation interface, the controller switches a folder for storing the image file between a first folder corresponding to the first file system and a second folder corresponding to the second file system in the recording medium.

The imaging apparatus of the present disclosure can facilitate management of an image file according to a user's preference.

BRIEF DESCRIPTION OF THE DRAWINGS

FIGS. 4A and 4B are explanatory views of a folder name and a file name of a DCF;

FIGS. 10A, 10B, 100 and 10D are explanatory views of a setting menu for a playback method in the digital camera according to the first embodiment;

DETAILED DESCRIPTION

Hereinafter, embodiments will be described in detail with reference to the drawings as appropriate. However, more detailed description than necessary may be omitted. For example, detailed description of already well-known matters and repeated description of substantially the same configuration may be omitted. This is to prevent the following description from being unnecessarily redundant and to allow a person skilled in the art to easily understand the present disclosure. Note that the inventor(s) provides the accompanying drawings and the following description in order for a person skilled in the art to fully understand the present disclosure, and does not intend to limit a subject matter recited in claims.

First Embodiment

In a first embodiment, a digital camera capable of capturing an image of a subject to record still image data and moving image data will be described as an example of an imaging apparatus according to the present disclosure.

1. Configuration

Figure 1:
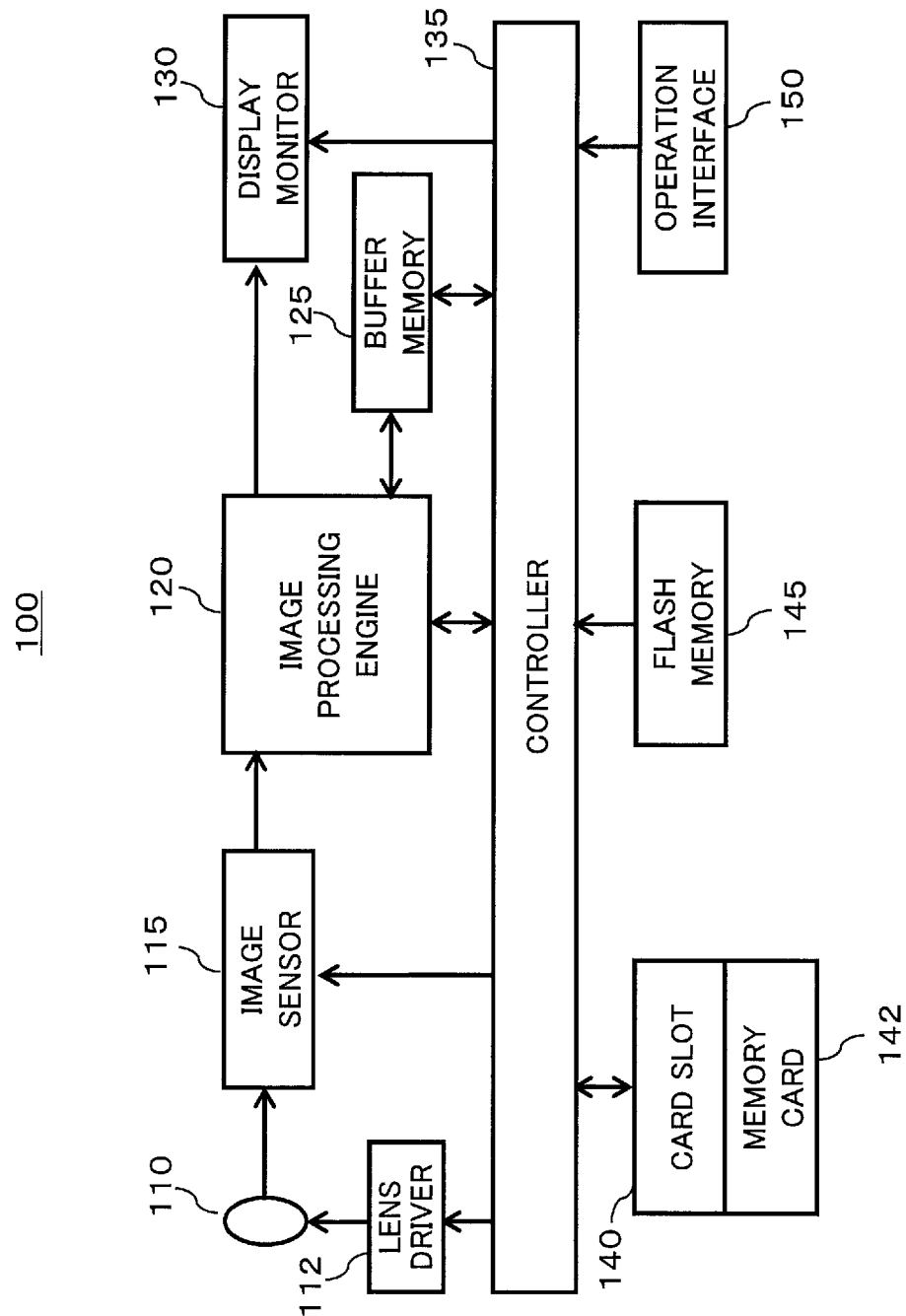
FIG. 1 illustrates a configuration of a digital camera according to a first embodiment of the present disclosure.

FIG. 1 illustrates a configuration of a digital camera 100 according to the present embodiment. The digital camera 100 according to the present embodiment includes an image sensor 115, an image processing engine 120, a display monitor 130, and a controller 135. The digital camera 100 further includes a buffer memory 125, a card slot 140, a flash memory 145, and an operation interface 150. The digital camera 100 further includes an optical system 110 and a lens driver 112, for example.

The optical system 110 includes a focus lens, a zoom lens, an optical image stabilizer (OIS) lens, a diaphragm, a shutter, and the like. The focus lens is a lens for changing a focus state of a subject image formed on the image sensor 115. The zoom lens is a lens for changing magnification of the subject image formed by the optical system. The focus lens or the like includes a single lens or a plurality of lenses.

The lens driver 112 drives the focus lens and the like of the optical system 110. The lens driver 112 includes a motor, and moves the focus lens along an optical axis of the optical system 110 under the control of the controller 135. A configuration of the lens driver 112 for driving the focus lens can be achieved by a DC motor, a stepping motor, a servo motor, an ultrasonic motor, or the like. The lens driver 112 includes a diaphragm actuator that drives the diaphragm of the optical system 110 under the control of the controller 135.

The image sensor 115 captures a subject image formed through the optical system 110 to generate image data. The image data forms image data indicating an image captured by the image sensor 115. The image sensor 115 generates image data of a new frame at a predetermined frame rate (e.g., 30 frames/second). A timing of generating image data and an electronic shutter operation in the image sensor 115 are controlled by the controller 135. The image sensor 115 can be various image sensors such as a CMOS image sensor, a CCD image sensor, and an NMOS image sensor.

The image sensor 115 performs an operation of capturing a moving image, a still image, or a through image, for example. The through image is mainly a moving image and is displayed on the display monitor 130 in order for a user to determine a composition for capturing a still image, for example. The image sensor 115 performs various operations such as exposure and electronic shutter. The image sensor 115 is an example of an imager in the present embodiment.

The image processing engine 120 performs various kinds of processing on the image data output from the image sensor 115 to generate image data. The image processing engine 120 also performs various kinds of processing on the image data to generate an image to be displayed on the display monitor 130. Examples of the various kinds of processing includes, but are not limited to, white balance correction, gamma correction, YC conversion processing, electronic zoom processing, compression processing, and expansion processing. The image processing engine 120 may include a hard-wired electronic circuit, or may include a microcomputer, a processor, or the like using a program.

The display monitor 130 is an example of a display that displays various kinds of information. For example, the display monitor 130 displays an image (through image) indicated by image data that is captured by the image sensor 115 and is subjected to image processing in the image processing engine 120. The display monitor 130 also displays a menu screen for allowing the user to make various settings for the digital camera 100, for example. The display monitor 130 can be configured with a liquid crystal display device or an organic EL device, for example.

The operation interface 150 is a general term for hard keys provided on the exterior of the digital camera 100, such as operation buttons and operation dials, and soft keys, and accepts a user operation. The operation interface 150 includes a release button, a mode dial, a touchscreen of the display monitor 130, and a joystick, for example. The operation interface 150 also includes virtual buttons and icons displayed on the display monitor 130. Specific examples of the operation interface 150 will be described below.

The controller 135 is a hardware controller, and integrally controls the entire operation of the digital camera 100. The controller 135 includes a CPU and the like, and the CPU executes a program (software) to achieve a predetermined function. The controller 135 may include a processor configured with a dedicated electronic circuit designed to achieve the predetermined function, instead of the CPU. That is, the controller 135 can be implemented in various processors such as a CPU, an MPU, a GPU, a DSU, an FPGA, and an ASIC. The controller 135 may include one or a plurality of processors. The controller 135 may also be formed as a single semiconductor chip together with the image processing engine 120 and the like.

The buffer memory 125 is a recording medium that functions as a work memory of the image processing engine 120 and the controller 135. The buffer memory 125 is implemented in a dynamic random access memory (DRAM) or the like. The flash memory 145 is a nonvolatile recording medium. For example, the buffer memory 125 stores various kinds of setting information on the digital camera 100. For example, the various kinds of setting information include setting information regarding a file name of a moving image, which is described later.

Although not illustrated, the controller 135 may include various internal memories such as a ROM. The ROM stores various programs to be executed by the controller 135. The controller 135 may also include a RAM that functions as a work area of the CPU.

The card slot 140 is an interface into which a detachable memory card 142 is inserted. The card slot 140 can be electrically and mechanically connected to the memory card 142 to write and read image data to and from the memory card 142. The memory card 142 is an external memory including a recording element such as a flash memory. The memory card 142 can store data such as image data generated by the image processing engine 120. Still image data or moving image data captured by the digital camera 100 are recorded on the memory card 142.

1-1. Operation Interface

Figure 2:
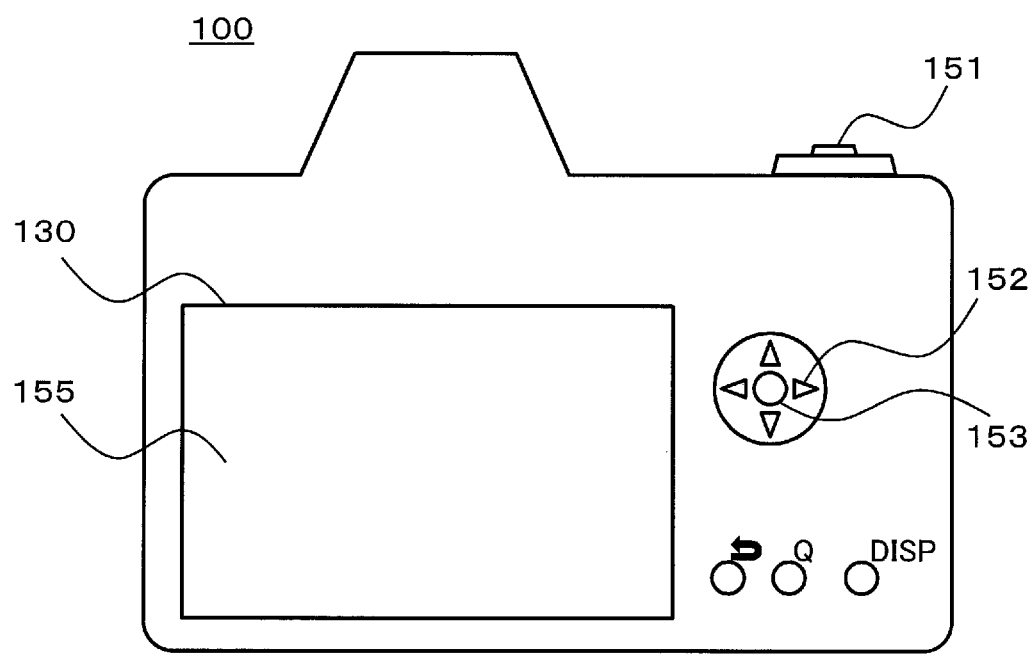
FIG. 2 illustrates a back surface of the digital camera.

A specific example of the operation interface 150 will be described with reference to FIG. 2. FIG. 2 illustrates a back surface of the digital camera 100.

FIG. 2 illustrates, as examples of the operation interface 150, a release button 151, selection buttons 152, a determination button 153 and a touchscreen 155. Upon receipt of a user operation, the operation interface 150 transmits various instruction signals to the controller 135. The controller 135 inputs the user operation on the basis of the instruction signals.

The release button 151 is a pushbutton. When the release button 151 is operated by the user, the controller 135 records image data captured at the timing of the pressing operation as a recorded image on the memory card 142 or the like.

The selection buttons 152 are pushbuttons provided in up, down, left, and right directions. By pressing one of the selection buttons 152 in the up, down, left, and right directions, the user can select various condition items as options displayed on the display monitor 130 or move a cursor.

The determination button 153 is a pushbutton. In a case where the user presses the determination button 153 when the digital camera 100 is in a shooting mode or a playback mode, the controller 135 displays a menu screen on the display monitor 130. The menu screen is a screen for setting various conditions for shooting/playback. When the determination button 153 is pressed in a condition that items for setting various conditions are being selected, the controller 135 settles settings of the selected items.

The touchscreen 155 is disposed to overlap a display screen of the display monitor 130, and detects a touch operation by the user's finger on the display screen. Thus, the user can perform operations such as various selections on the menu screen displayed on the display monitor 130.

2. Operation

An operation of the digital camera 100 configured as described above will be described below.

The digital camera 100 according to the present embodiment makes available two types of systems as a file system for recording an image file such as a still image file or a moving image file on the memory card 142. An outline of such an operation of the digital camera 100 will be described with reference to FIG. 3.

Figure 3B:
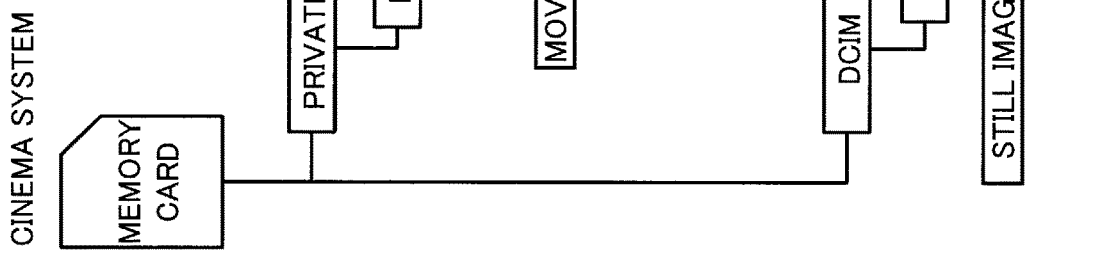
FIGS. 3A and 3B illustrate an outline of an operation of the digital camera according to the first embodiment.
Figure 3A:
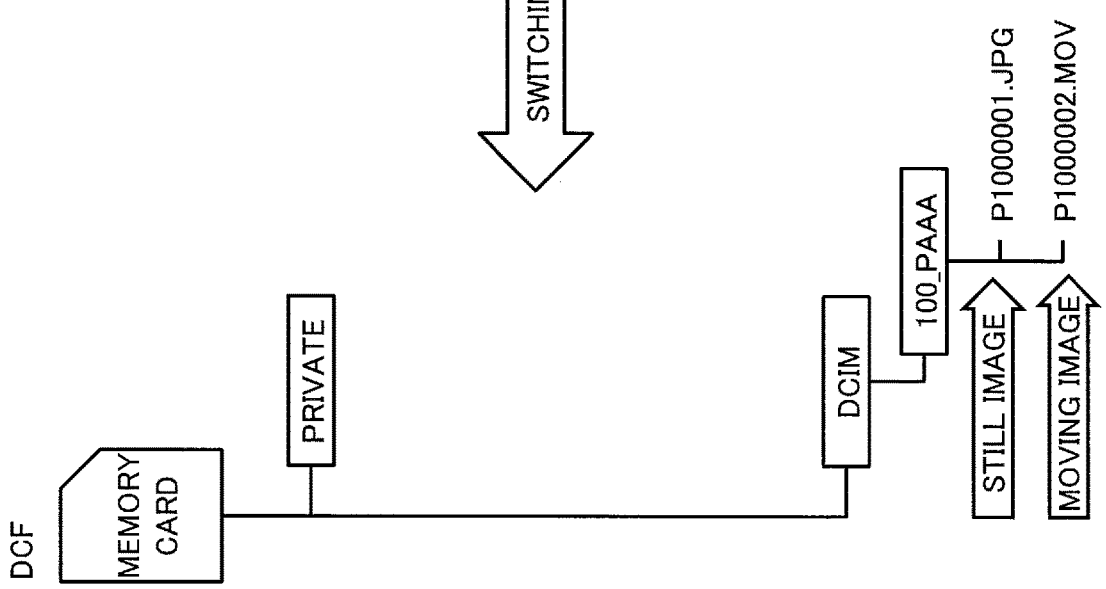

FIGS. 3A and 3B illustrate data structures in the memory card 142 in accordance with first and second file systems of the digital camera 100. The file system is a system for managing various image files by defining a configuration of a directory (hereinafter, also referred to as "folder"), a folder name, and a file name used when the image files are stored in the memory card 142.

FIG. 3A illustrates a data structure in which the first file system is applied to the memory card 142. In the present embodiment, a DCF is adopted as the first file system of the digital camera 100, assuming a general user including a beginner. The DCF is a file system following the DCF standard. The DCF standard is standardized for digital still cameras and the like, and is widely used for managing still image files.

FIG. 3B illustrates a data structure in which the second file system is applied to the memory card 142. In the present embodiment, a cinema system is adopted as the second file system of the digital camera 100, assuming a professional user such as a professional photographer. The cinema system is a file system suitable for movie production or the like. The cinema system manages an image file so that various kinds of information, such as a device used for capturing a moving image, can be specified from a file name or the like.

The digital camera 100 according to the present embodiment accepts a user operation for switching the file system that the user is going to use between the DCF and the cinema system. Thus, the digital camera 100 can record image files so as to meet needs of various users. For example, in a case where a plurality of users share a single digital camera 100, it is possible to meet a need of each user to select a preferred file system.

2-1. Operation of Recording Image File

An operation in which the digital camera 100 according to the present embodiment records an image file on the memory card 142 will be described with reference to FIGS. 3 to 5.

In FIG. 3, each folder is indicated by a rectangle, and a folder name is shown in each rectangle. A file name of a file stored in the folder is also shown. Two folders, i.e., a DCIM folder (hereinafter, referred to as "DCIM") and a PRIVATE folder (hereinafter, referred to as "PRIVATE") are provided directly under the uppermost directory in the memory card 142.

The DCIM is a folder defined by the DCF. The PRIVATE is a folder in which a subordinate folder following a standard other than the DCF standard can be created and a file following that standard can be recorded. The PRIVATE stores a folder and a file of the cinema system in the present embodiment. The digital camera 100 creates a folder and records an image file in a subordinate folder of each folder (i.e., under each folder) in accordance with each file system. The DCIM and PRIVATE are examples of first and second folders, respectively, in the present embodiment.

The digital camera 100 according to the present embodiment records a moving image file in accordance with a file system set by the user, and stores the moving image file in the DCIM or PRIVATE. The moving image file may be in various formats such as the MOV format and the MP4 format.

Meanwhile, the digital camera 100 according to the present embodiment records a still image file in accordance with the DCF, regardless of a user setting, and stores the still image file in the DCIM. The still image file may be in various formats such as the JPEG format, the RAW format, and the HSP format. Thus, because the still image file is recorded following the widely used DCF standard, it is possible to improve compatibility with other devices to enhance user convenience, for example.

2-1-1. DCF

FIG. 4A is an explanatory view of a folder name of the DCF. FIG. 4B is an explanatory view of a file name of the DCF.

According to the DCF standard, as illustrated in FIG. 4A, the folder name is defined by a directory number of three digits and free characters of five alphanumeric. In the digital camera 100, free characters for a folder of the DCF are set to "_PAAA" in advance, and are stored in the flash memory 145 or the like, for example.

When creating a folder of the DCF, the controller 135 of the digital camera 100 determines a folder name so as to increment the directory number, referring to the free characters set in advance and the directory number of an existing folder. Thus, in the example of FIG. 3A, a folder having a folder name "100_PAAA" is created under the DCIM.

Further, according to the DCF standard, as illustrated in FIG. 4B, the file name is defined by free characters of four alphanumerics and a file number of four digits. In the digital camera 100, the free characters of a file of the DCF are set in advance to a combination of a predetermined character "P" and a directory number of a folder to store the file, for example.

When recording an image file according to the DCF, the controller 135 of the digital camera 100 determines a file name so as to increment the file number, referring to the predetermined character, the directory number of a folder in which the image file is to be recorded (hereinafter, also referred to as a "recording folder"), and the file number of a file present in the folder. Thus, in the example of FIG. 3A, a still image file having a file name "P1000001" and a moving image file having a file name "P1000002" are recorded in the above described folder under the DCIM.

2-1-2. Cinema System

Figure 5A:
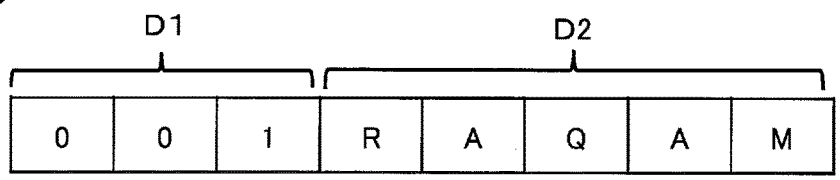
FIGS. 5A and 5B are explanatory views of a folder name and a file name of a cinema system.
Figure 5B:
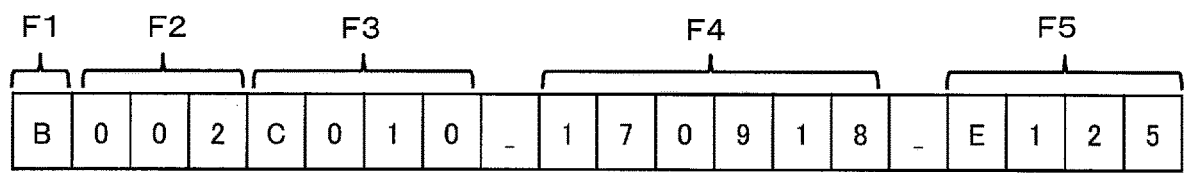

FIG. 5A is an explanatory view of a folder name of the cinema system. FIG. 5B is an explanatory view of a file name of the cinema system.

As illustrated in FIG. 5A, a folder name of the cinema system includes a folder number D1 of three digits and an information character string D2 of five characters. The information character string D2 indicates information on various settings regarding a recording format used when a moving image is captured, for example. For example, according to the cinema system it is defined that each character in sequence in the information character string D2 indicates the number of pixels (and an angle of view), a base frame rate, a video format, a codec, and a recording setting, respectively, of a moving image file. For example, in "RAQAM" of the information character string D2 in FIG. 5A, the first character "R" indicates that the number of pixels (and the angle of view) is 4K (16:9).

In the digital camera 100, when the user changes a setting regarding a photographic recording, such as moving image quality, the controller 135 determines the information character string D2 corresponding to the changed setting in accordance with the cinema system, and creates a new folder based on the determined information character string D2. When creating a folder of the cinema system, the controller 135 determines a folder name so as to increment the folder number D1, referring to various settings regarding the information character string D2 and folder number of an existing folder.

In the example of FIG. 3B, a folder "PAAA_GRP" dedicated to the cinema system is created under the PRIVATE, and a folder for specific moving image quality, such as a folder having a folder name "001RAQAM", is created under the folder "PAAA_GRP". The folder "PAAA_GRP" is a folder for storing a moving image file following the cinema system.

FIG. 5B illustrates a configuration example of the file name in the cinema system. The file name of the cinema system includes a camera index F1, a card number F2, a clip number F3, a shooting date F4, and a hash value F5. In the cinema system, the camera index F1 and the card number F2 correspond to a volume label that indicates an identification name (or the root directory) of the memory card 142.

When recording a file according to the cinema system, the controller 135 of the digital camera 100 determines a file name so as to increment the clip number F3, referring to the volume label of the memory card 142, the clip number F3 of a file present in a recording folder, and the like. FIG. 5B illustrates a case where the volume label of the memory card 142 is "B002". In this case, the camera index F1 is "B", and the card number F2 is "002".

In addition, the controller 135 generates the shooting date F4 in the file name of the cinema system based on a recording start time of a moving image file. The hash value F5 is a value unique to the digital camera 100, and is generated based on a serial number of the digital camera 100, for example. With such an operation, in the example of FIG. 3B, a moving image file having a file name "B002C010_170918_E125" is recorded in the above-described folder for the specific moving image quality under the PRIVATE.

Thus, in the cinema system, it is possible to easily classify a moving image file by associating various kinds of information regarding shooting of a moving image with character strings of a folder name and a file name.

2-2. Operation of Setting File System

The digital camera 100 according to the present embodiment performs an operation for allowing the user to set a desired file system in a setting menu or the like in advance before a shooting operation of a moving image. An operation of setting a file system in the digital camera 100 will be described with reference to FIGS. 6A to 6C and 7.

Figure 6B:
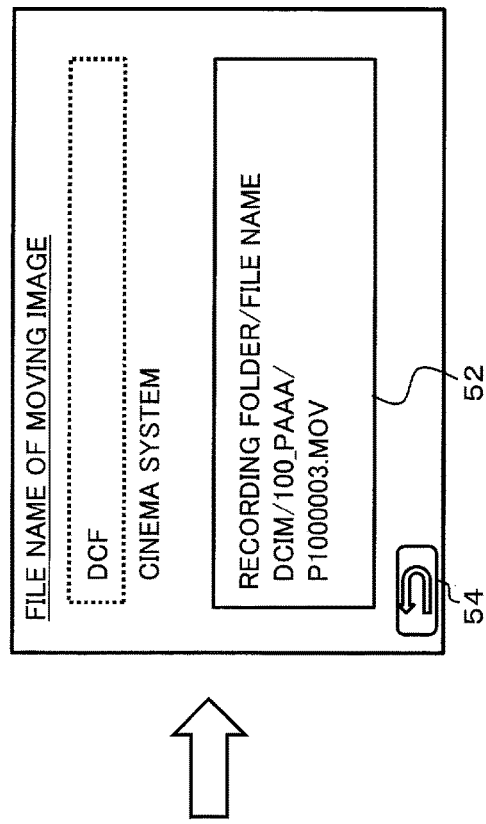
FIGS. 6A, 6B and 6C are explanatory views of an operation of setting a file system in the digital camera.
Figure 6C:
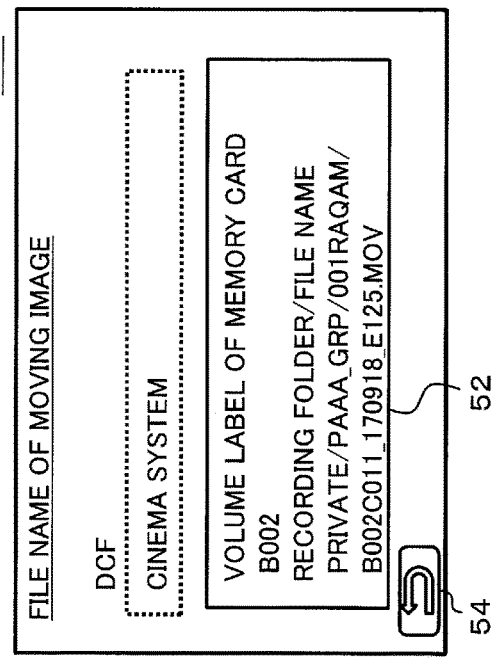
Figure 6A:
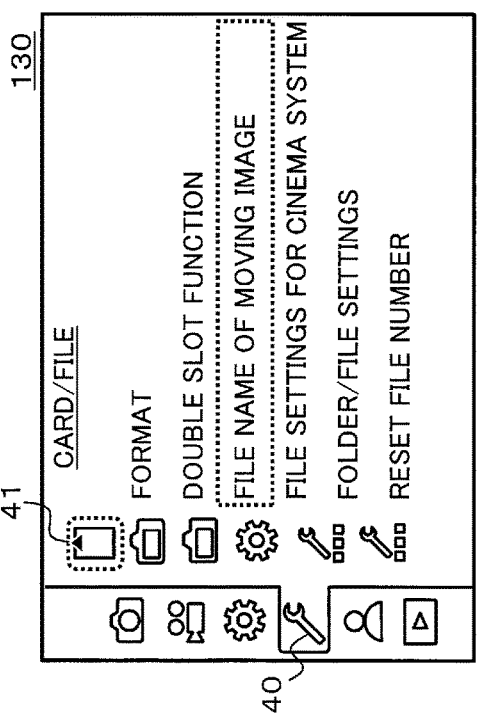

FIGS. 6A, 6B and 6C are explanatory views of the operation of setting a file system in the digital camera 100. FIG. 6A illustrates a display example of a setting menu screen in the digital camera 100. FIGS. 6B and 6C illustrate display examples of a setting screen that transitions from the example of FIG. 6A during the operation of setting a file system.

The display example in FIG. 6A illustrates a state in which a custom setting tab 40 for setting various kinds of information regarding the digital camera 100 is selected and an icon 41 for setting information regarding the memory card 142 or recording a file is selected. The display monitor 130 displays "file name of moving image" or the like as a menu item at this time.

The menu item "file name of moving image" is provided so that the user can set a preferred file system regarding recording of a moving image file. When the user selects the menu item in FIG. 6A and inputs a determination operation, the display monitor 130 displays the setting screen of the file name of a moving image (FIGS. 63 and 6C). The determination operation is achieved by an operation of pressing the determination button 153 while one of the menu items is being selected on the setting menu screen, for example.

In the display examples of FIGS. 6B and 6C, the display monitor 130 displays the "DCF" and the "cinema system" as options in the setting of a file name of a moving image, a reference section 52, and a return button 54. The reference section 52 displays information regarding a moving image file to be recorded in a case where a moving image is captured while the currently selected file system is set. The return button 54 receives a user operation for returning from the currently displayed menu screen to its parent menu screen or the like.

FIG. 6B illustrates a display example where the DCF is selected by a user operation. When the DCF is selected, the reference section 52 displays a recording folder and a file name of the moving image file, in accordance with the DCF in a subsequent shooting operation. By the reference section 52, the user can confirm that, the file name of the moving image file becomes similar to that of a still image file following the DCF standard when the DCF is selected, for example.

FIG. 6C illustrates a display example where the cinema system is selected by a user operation. When the cinema system is selected, the reference section 52 displays a recording folder, a file name of the moving image file, and the volume label of the memory card 142, respectively in accordance with the cinema system. In the reference section 52 as illustrated in FIG. 6C, information such as a file name, which tends to be long particularly in the cinema system, can be displayed readably by separating a line of the recording folder and a line of the file name, for example. In this example, the memory card 142 of a volume label "B002" is inserted into the card slot 140.

Figure 7:
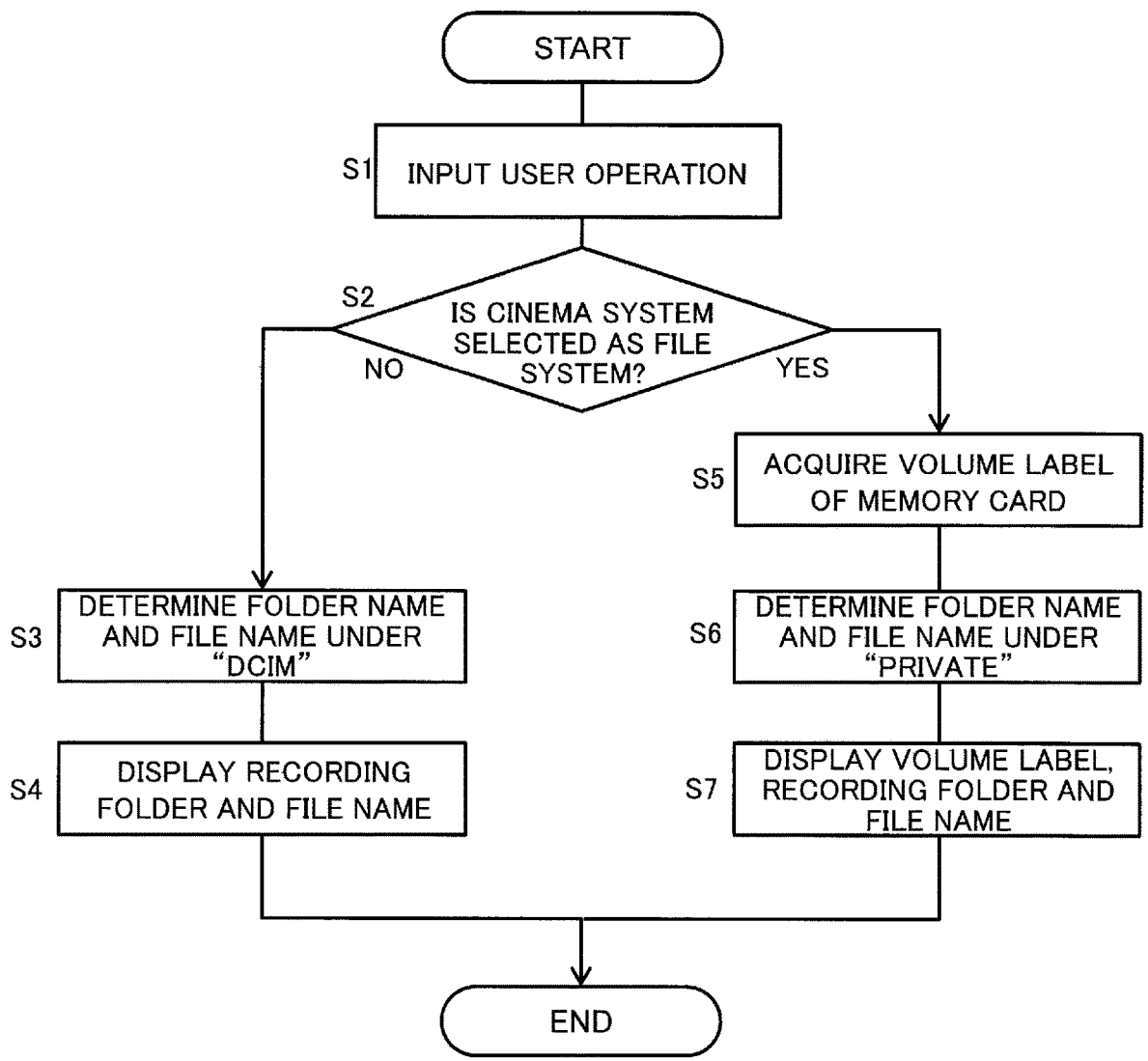
FIG. 7 is a flowchart showing an operation to set a file system.

Processing performed by the controller 135 of the digital camera 100 during the operation of the example in FIGS. 6A to 6C described above will be described with reference to FIG. 7. FIG. 7 is a flowchart showing an operation of setting a file system in the digital camera 100.

First, the controller 135 inputs a user's selection operation performed in the operation interface 150 (S1). For example, the controller 135 acquires a result of the user operation selecting the DCF or the cinema system as an option. The user operation is performed using the selection button 152 or the like on the setting menu screen of the file name of a moving image (FIGS. 6B and 6C).

Next, the controller 135 determines whether or not the file system selected by the user operation is the cinema system (S2), for example. For example, when the DCF is selected, it is determined that the selected file system is not the cinema system (NO in S2).

When the selected file system is the DCF (NO in S2), the controller 135 determines a name of a recording folder and a file name of the moving image file in accordance with the DCF (S3). In step S3, the controller 135 determines the file name and the like to be recorded next, referring to a folder name and file name present under the DCIM.

Next, the controller 135 causes the display monitor 130 to display the recording folder and the file name that are determined (S4). The reference section 52 in FIG. 6B is a display example where the DCF is selected (NO in S2) when the memory card 142 is in a state of FIG. 3A.

Meanwhile, when the selected file system is the cinema system (YES in S2), the controller 135 acquires a volume label of the memory card 142 (S5).

Further, the controller 135 determines a recording folder and a file name of the moving image file in accordance with the cinema system, referring to various kinds of information in the digital camera 100 (S6). The information referred to in step S6 is information for determining the file name and the like of the moving image file to be recorded next, with reference to the current time, in accordance with the cinema system (see FIG. 5). The information may include a folder name and a file name of a folder and a file present under the PRIVATE, and may also include setting information on the moving image quality, for example.

Next, the controller 135 causes the display monitor 130 to display the acquired volume label of the memory card 142, the determined recording folder, and the determined file name (S7). The reference section 52 in FIG. 6C indicates a display example where the cinema system is selected (YES in S2) without changing settings of the moving image quality and the like, when the memory card 142 is in a state of FIG. 3B.

Thereafter, when a user operation to set the selected file system is input on the setting menu screen in FIG. 6B or 6C, the controller 135 sets the file system in the digital camera 100 and terminates the processing of this flowchart of FIG. 7, for example.

According to the above processing, in response to the user's selection operation on the setting menu screen of the file name of a moving image (S2), the digital camera 100 displays the file name and the like of the moving image file in accordance with the selected file system (S4, S7). Thus, the user can set the file system to be used for recording the moving image file, referring to the displayed file name and the like.

2-3. Image Capturing/Playback Operation

An operation will be described below that the digital camera 100 captures or reproduces a moving image or the like after the above-described operation of setting a file system is performed.

Figure 8A:
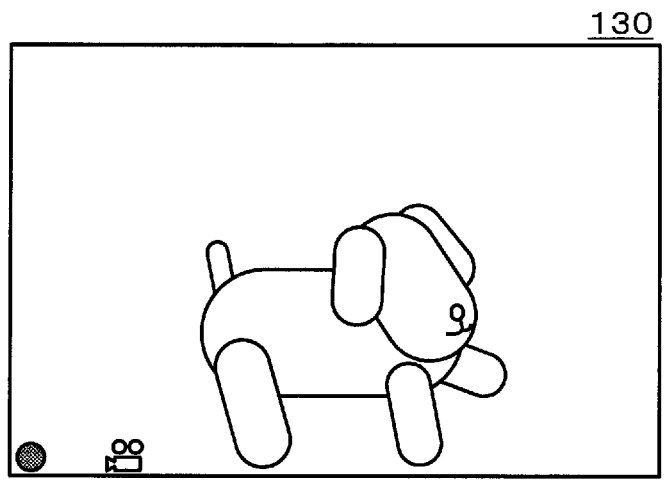
FIGS. 8A and 8B illustrate display examples of a moving image shooting screen.
Figure 8B:
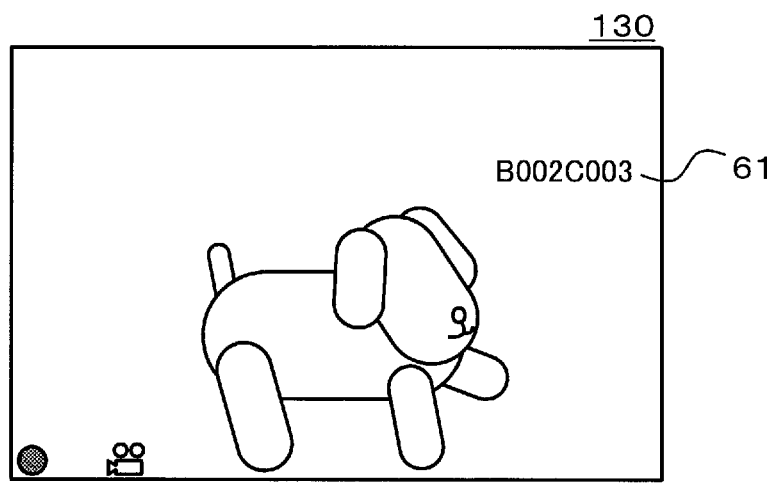

FIGS. 8A and 8B illustrate display examples of a moving image shooting screen in the digital camera 100. FIG. 8A illustrates a display example when the DCF is set by the operation of setting a file system. FIG. 8B illustrates a display example when the cinema system is set.

In the present embodiment, in a case where a moving image is captured in accordance with the DCF, the display monitor 130 does not particularly display a file name or the like of the moving image as illustrated in FIG. 8A. Meanwhile, in the cinema system, as illustrated in FIG. 8B, the display monitor 130 displays a clip name 61 on a screen during shooting of a moving image, and on a standby screen after the shooting is completed and before next shooting starts, for example.

The clip name 61 in FIG. 8B is the first eight characters of the file name of a moving image according to the cinema system (see FIG. 5B). From the display of the clip name 61 in this example, the user can confirm successively that a moving image file being shot or most recently shot is recorded on the memory card 142 of the volume label "B002" with a clip number "C003".

2-3-1. Problems in Playback

Problems and solutions thereof regarding playback in the digital camera 100 according to the present embodiment will be described with reference to FIGS. 9A, 9B, 9C and 9D. FIGS. 9A to 9D are explanatory views of an outline of operations performed at the time of shooting and playback in the digital camera 100.

Figure 9A:
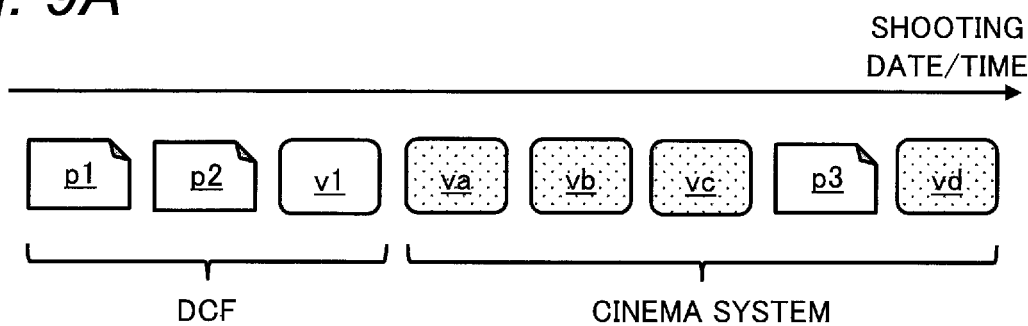
FIGS. 9A, 9B, 9C and 9D are explanatory views of an outline of operations performed at the time of shooting and playback in the digital camera according to the first embodiment.

FIG. 9A illustrates a shooting situation that causes a problem in playback in the digital camera 100. In this example, first, shooting is performed while the DCF is being set as the file system in the digital camera 100, and still image files p1 and p2 and a moving image file v1 are recorded in the order listed. Then, shooting is further performed after the file system is changed to the cinema system, and moving image files va, vb, and vc, a still image file p3, and a moving image file vd are recorded in the order listed.

In the situation of FIG. 9A, the digital camera 100 records the still image files p1 and p2 and the moving image file v1 under the DCIM according to the DCF (see FIG. 3A). After the file system is changed as described above, the digital camera 100 records the moving image files va to vd under the PRIVATE according to the cinema system, whereas the digital camera 100 records the still image file p3 under the DCIM, regardless of the setting of the file system (see FIG. 3B).

As described above, in the digital camera 100 according to the present embodiment, the image files p1 to p3, v1, and va to vd which are resulted from various shooting may be recorded in different folders in a distributed manner, such as under the DCIM and PRIVATE, due to the function capable of changing the file system. For example, even in a setting where the moving image files va to vd are to be recorded in a folder under the PRIVATE, the still image file p3 is recorded in a folder under the DCIM. Due to such distribution, at the time of a playback operation to display the image files in the digital camera 100, an image file that the user intends to confirm may not be included in a folder to be reproduced, or the image file may not be displayed until other image files are displayed. This may cause a problem that images cannot be efficiently confirmed.

Figure 9B:
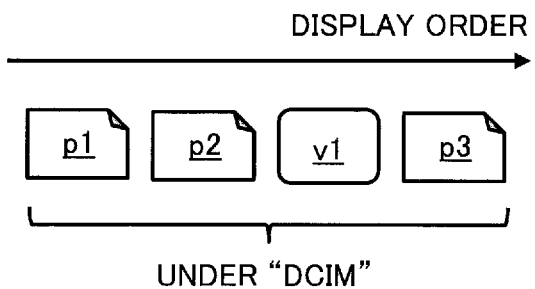
Figure 9C:
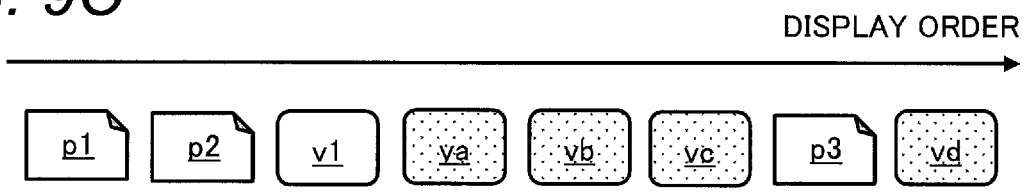
Figure 9D:
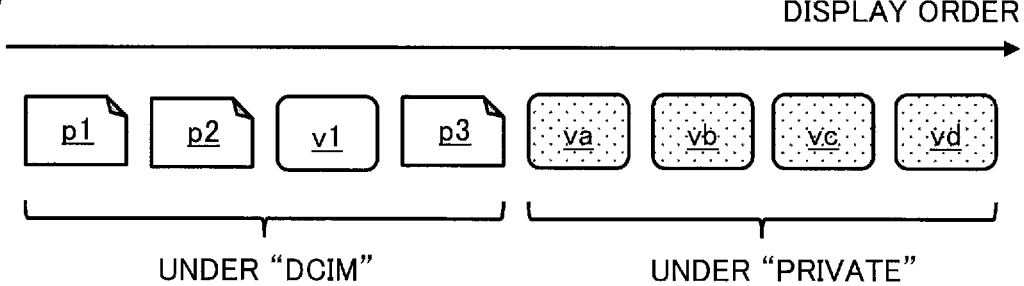

Therefore, the digital camera 100 according to the present embodiment provides a plurality of playback methods in order that the user can easily and efficiently confirm an image intended in a playback operation of image files. FIGS. 9B to 9D illustrate various playback methods performed when an image capturing result in FIG. 9A is reproduced.

In the playback method of FIG. 9B, a range of the image files to be reproduced in the digital camera 100 is limited to the image files under the DCIM, and the image files in the range are displayed in the shooting order, for example. In the playback method of FIG. 9C, a range of the image files to be reproduced is the image files under the DCIM and the PRIVATE, and the image files under both the folders are displayed in the shooting order in a mixed manner. In the playback method of FIG. 9D, a range of the image files to be reproduced is similar to that in FIG. 9C, and the image files are displayed in the file name order, such that the image files under the DCIM are displayed first and then the image files under the PRIVATE are displayed, for example.

2-3-2. Setting of Playback Method

The digital camera 100 according to the present embodiment accepts a user operation that allows the user to set the above playback method in the setting menu or the like. The setting menu for the playback method in the digital camera 100 according to the present embodiment will be described with reference to FIGS. 10A, 10B, 100 and 10D.

Figure 10A:
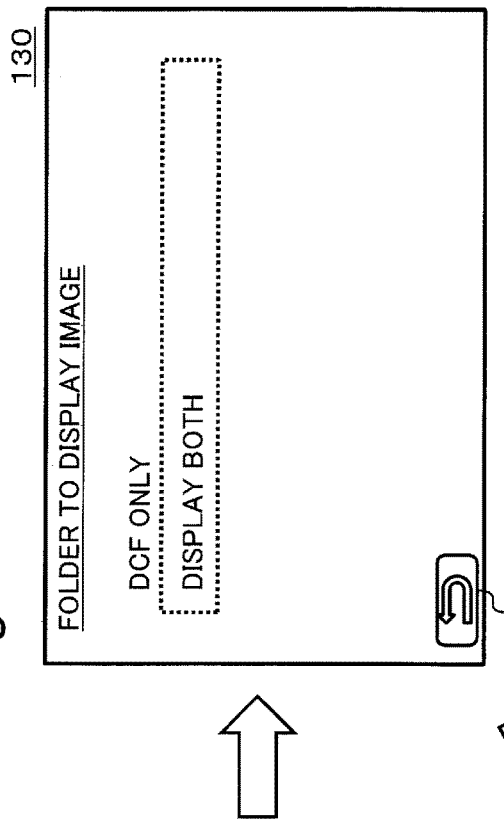
Figure 10C:
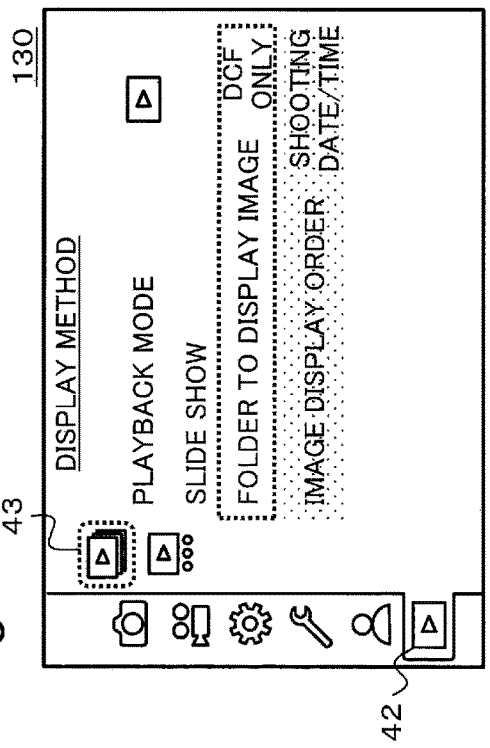

FIG. 10A illustrates a display example of the setting menu screen in the digital camera 100. This display example illustrates a state in which a playback tab 42 for making settings regarding a playback operation is selected and an icon 43 regarding an image display method is selected. The display monitor 130 displays "folder to display image", "image display order", and the like as menu items in this example.

Figure 10B:
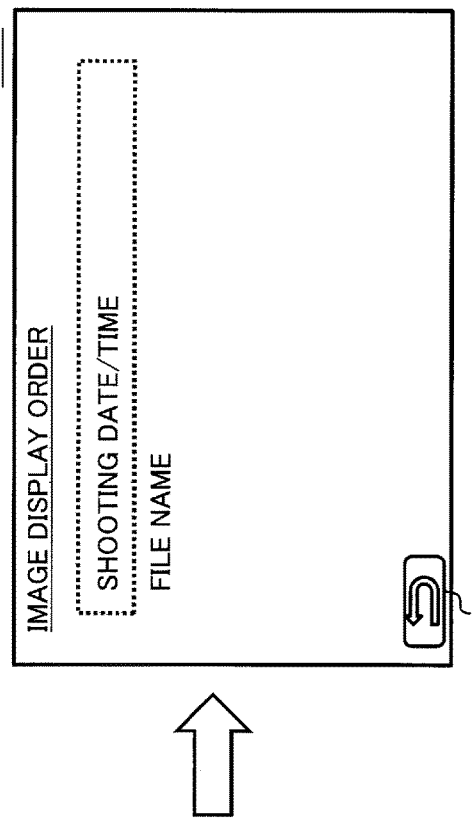

The menu item "folder to display image" is provided for the user to set a folder in which an image is displayed in the playback operation. FIG. 10B illustrates a setting screen of the folder to display image, which is displayed when the menu item "folder to display image" is selected in FIG. 10A and a determination operation is input.

In the display example of FIG. 10B, the display monitor 130 displays "DCF only" and "display both" as options in a setting of the folder to display image and the return button 54. In a case where the folder to display image is set to "DCF only", as illustrated in FIG. 9B, only the image files recorded under the DCIM according to the DCF are displayed in the playback operation.

Meanwhile, in a case where the folder to display image is set to "display both", as illustrated in FIGS. 9C and 9D, both the image files recorded under the DCIM according to the DCF and the moving image files recorded under the PRIVATE according to the cinema system are displayed in the playback operation. The display order in FIG. 9C or the display order in FIG. 9D is selected in the menu item "image display order". FIG. 100 illustrates the setting menu screen displayed in a case where the option "display both" is selected in FIG. 10B and a determination operation is input.

Figure 10D:
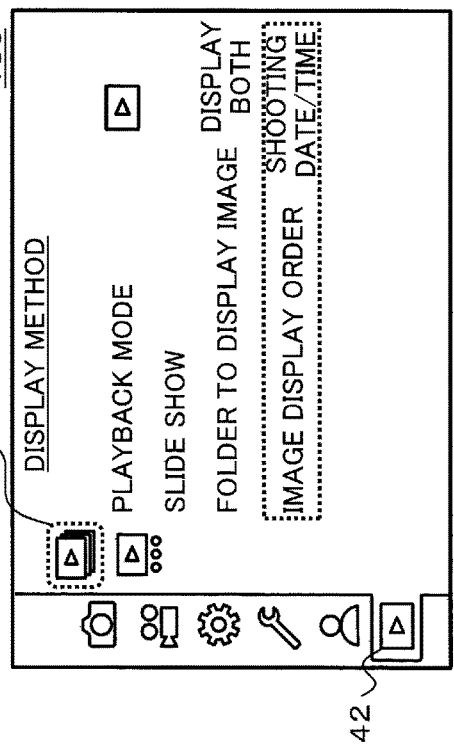

A user operation for the menu item "image display order" is effectively accepted only when the folder to display image is set to "display both" as illustrated in FIG. 100, for example. When the folder to display image is set to "DCF only", the menu item "image display order" is grayed out to indicate that the menu item is not available as illustrated in FIG. 10A, for example. FIG. 10D illustrates an example of the setting screen of the image display order, which is displayed when the menu item "image display order" is selected and a determination operation is input in FIG. 100.

In the display example of FIG. 10D, the display monitor 130 displays "shooting date/time", "file name", and the like as options to set the image display order. When the image display order is set to "shooting date/time", the playback operation is performed so as to display the image files in the shooting order as illustrated in FIG. 9C. When the image display order is set to "file name", the playback operation is performed so as to display the image files in the file name order as illustrated in FIG. 9D.

With such a setting menu, the user can set, before the playback operation, a playback method of image files based on the folder to display image and the image display order, in the digital camera 100 according to the present embodiment. The digital camera 100 stores setting information on the playback method in the buffer memory 125, for example.

The digital camera 100 may accept a user operation of setting the image display order not only when the folder to display image is set to "display both" but also when the folder to display image is set to "DCF only". In this case, a user operation for the menu item "image display order" may be effectively accepted in a setting menu similar to that of FIG. 10A or 100, regardless of the setting of the folder to display image, and the screen may transition to a setting screen similar to that of FIG. 10D, for example. Even in this case, a range of image files to be reproduced is set to the image files under the DCIM, and the image files in the range can be displayed in the set order selected from shooting order and file name order.

2-3-3. Playback Operation

A playback operation based on the setting of the playback method will be described with reference to FIGS. 11 to 13.

Figure 11:
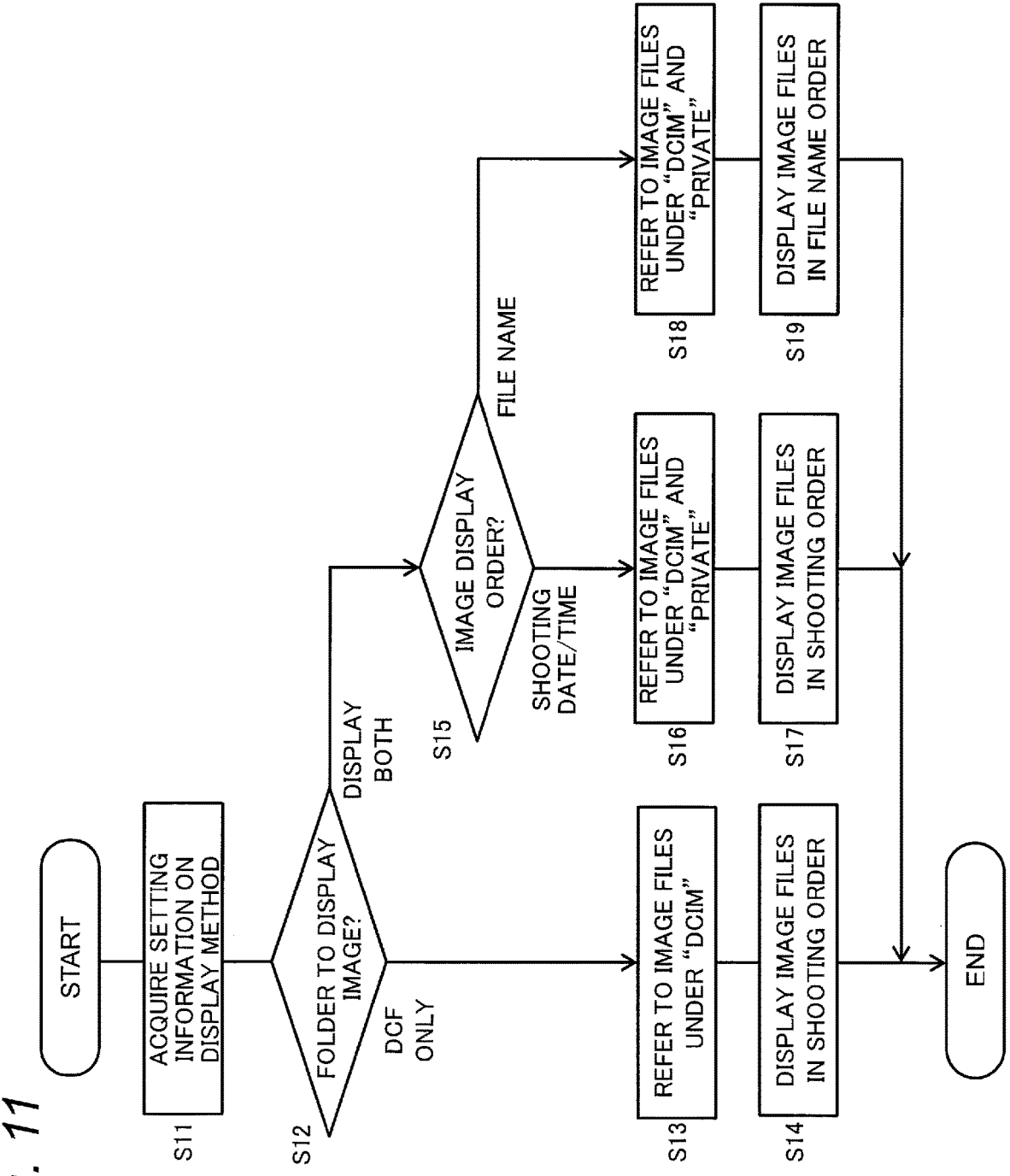
FIG. 11 is a flowchart showing a playback operation in the digital camera according to the first embodiment.

FIG. 11 is a flowchart showing a playback operation in the digital camera 100 according to the present embodiment. Processing of this flowchart is started when a predetermined user operation for performing a playback operation is input after the playback method is set as described above, and is performed by the controller 135, for example.

Figure 12A:
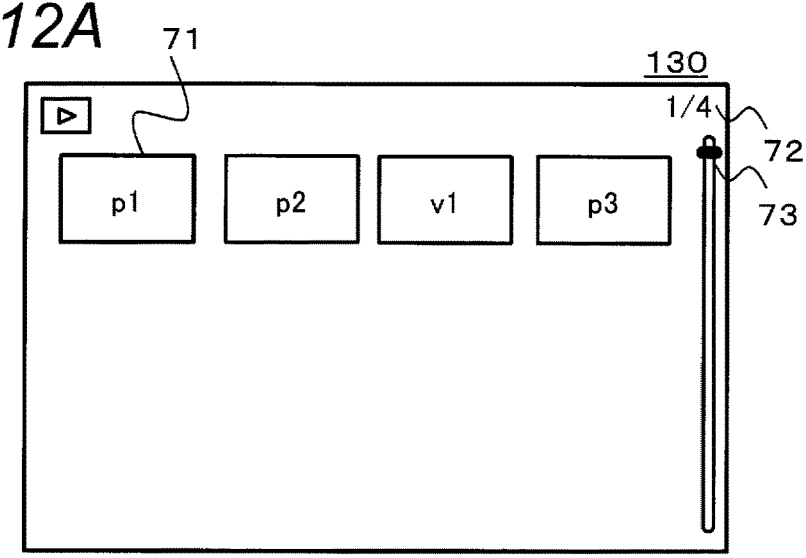
FIGS. 12A, 12B and 12C illustrate display examples of a multi playback screen in a playback operation.
Figure 12B:
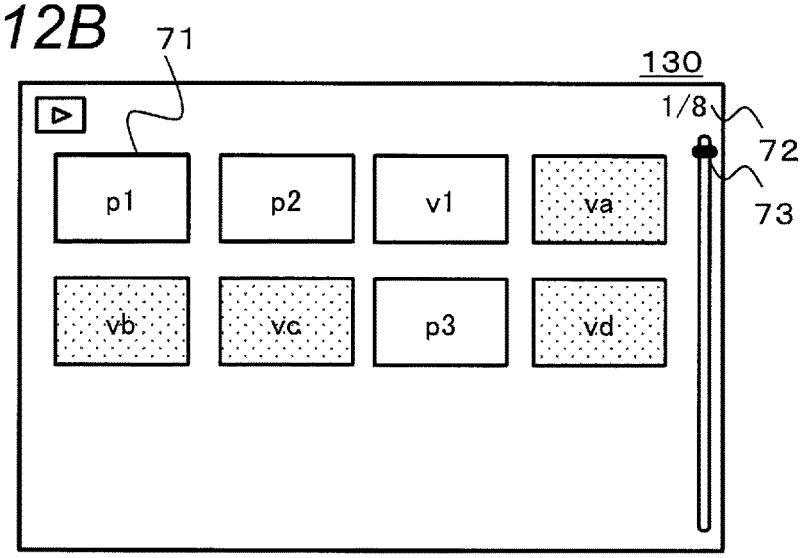
Figure 12C:
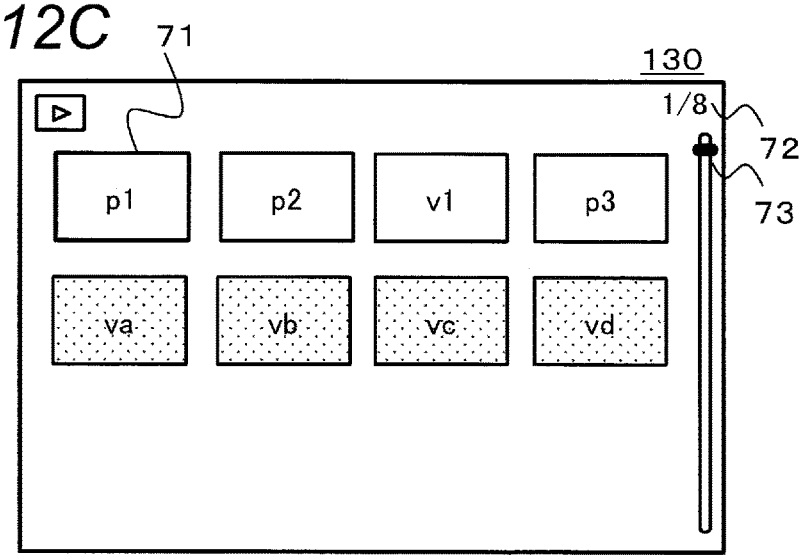
Figure 13:
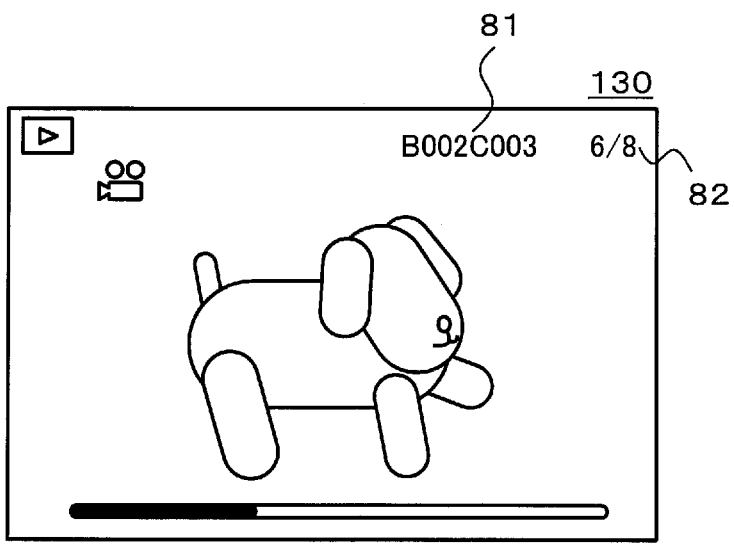
FIG. 13 illustrates a display example of a single playback screen in a playback operation.

FIGS. 12A, 123 and 12C illustrate display examples of a multi playback screen in the playback operation of the digital camera 100. The display monitor 130 displays thumbnail images 71, order indication 72, and a scroll bar 73. The controller 135 displays the thumbnail images 71 based on still image files and the thumbnail image 71 based on a moving image file listed in lines on the multi playback screen. The order indication 72 indicates the order of the selected image file with respect to the total number of image files to be displayed. The scroll bar 73 is provided so that the thumbnail images 71 that cannot be displayed in one screen of the display monitor 130 are displayed in turn in response to a user operation. In FIGS. 12A to 12C, the thumbnail images 71 are displayed sequentially in a horizontal direction in order from upper left to lower right in the drawings.

In FIG. 11, the controller 135 first acquires the setting information on the playback method stored in the buffer memory 125 (S11), and determines whether the folder to display image set in the setting information is "DCF only" or "display both" (S12).

When the set folder to display image is "DCF only", the controller 135 refers to image files present under the DCIM (S13), and displays the image files in the shooting order, for example (S14). FIG. 12A illustrates the multi playback screen in step S14. In FIG. 12A, the thumbnail images 71 of the still image files p1, p2, and p3 and the moving image file v1 recorded according to the DCF are displayed in the shooting order (see FIGS. 9A and 93).

Meanwhile, when the set folder to display image is "display both", the controller 135 determines whether the image display order set in the setting information is "shooting date/time" or "file name" (S15).

When the set image display order is "shooting date/time", the controller 135 refers to image files under the DCIM and PRIVATE (S16), and displays the image files in the shooting order (S17). FIG. 12B illustrates the multi playback screen in step S17. In FIG. 12B, the thumbnail images 71 of all the image files recorded under the DCIM and PRIVATE are displayed in the shooting order (see FIGS. 9A and 9C).

When the set image display order is "file name", the controller 135 refers to the image files under the DCIM and PRIVATE (S18), and displays the image files in the file name order (S19). FIG. 12C illustrates the multi playback screen in step S19. In FIG. 12C, the thumbnail images 71 of all the image files similar to those in FIG. 12B are displayed in the file name order such that the still image files p1 to p3, the moving image file v1 of the DCF, and the moving image files va to vd of the cinema system are displayed in the order listed (see FIG. 9D).

After the image files are displayed (S14, S17, S19), the controller 135 terminates the processing of this flowchart in response to, for example, an input of a user operation determining to change an operation mode of the digital camera 100.

According to the playback operation described above, the image files are displayed in accordance with the user settings of the folder to display image and the image display order (S11 to S19). Thus, even when still image files following the DCF standard and moving image files according to the DCF or the cinema system are recorded in a mixed manner under the DCIM and PRIVATE, it is possible to easily perform playback and display according to the user's intention.

In steps S14, S17, and S19 described above, the image files may be individually reproduced and displayed, instead of being displayed in a listed manner as illustrated in FIGS. 12A to 12C. FIG. 13 illustrates a display example of an individual playback screen in the playback operation of the digital camera 100.

For example, when one of the thumbnail images 71 is selected on the multi playback screen in any one of FIGS. 12A to 12C and a determination operation is input, the display monitor 130 displays the individual playback screen for displaying an image file corresponding to the thumbnail image 71. FIG. 13 illustrates an individual display screen displayed when the thumbnail image 71 of the moving image file vc recorded in accordance with the cinema system is selected on the multi playback screen of FIG. 12B. The display monitor 130 displays the reproduced image of the moving image file vc together with a clip name 81 and order indication 82, for example.

As in the moving image shooting screen of FIG. 8B, the digital camera 100 according to the present embodiment displays, as the clip name 81, the first eight characters of the file name of the moving image in accordance with the cinema system. Thus, as to the reproduced moving image file, the user can confirm the recorded volume label and clip number of the memory card 142 (see FIG. 5B). When a moving image file recorded in accordance with the DCF is reproduced the digital camera 100 may as well display a name of a recording folder and a file name thereof, for example.

3. Effects and the Like

As described above, the digital camera 100 according to the present embodiment is an example of an imaging apparatus that records an image file on the memory card 142 (recording medium). The digital camera 100 includes the image sensor 115 (imager), the controller 135 (controller), and the operation interface 150. The image sensor 115 captures a subject image to generate image data. The controller 135 records an image file based on the image data on the memory card 142. The operation interface 150 inputs a user operation for selecting a file system from the DCF and the cinema system (first and second file systems) different from each other (S1). The file system manages an image file in the memory card 142. In accordance with the user operation input in the operation interface 150, the controller 135 switches a folder for storing the image file between the DCIM (first folder) corresponding to the DCF and the PRIVATE (second folder) corresponding to the cinema system in the memory card 142 (see FIG. 3).

The digital camera 100 described above can switch the file that the user is going to use between the DCF and the cinema system. This makes it possible to facilitate management of an image file according to the user's preference in the digital camera 100.

In the present embodiment, the controller 135 sets at least one of a file name of the image file to be recorded on the memory card 142, a folder configuration and a folder name in the folder for storing the image file, in accordance with a file system selected by the user operation from the DCF and the cinema system (see FIGS. 3, 4B, and 5B). In the present embodiment, the controller 135 also determines the recording folder and a folder name thereof in accordance with the file system selected by the user operation (see FIGS. 3, 4A, and 5A).

In the present embodiment, the controller 135 records a moving image file based on the image data in a folder corresponding to the file system selected from the DCIM and PRIVATE, depending on the user operation input in the operation interface 150. The controller 135 records a still image file based on the image data in the DCIM, without depending on the user operation input in the operation interface 150 (see FIG. 3). This makes it possible to record the moving image file according to the file system selected by the user in accordance with the user's preference and record the still image file in conformity with the DCF standard standardized for digital still cameras and the like.

In the present embodiment, the DCF is defined by the Design rule for Camera File system (DCF) standard (see FIG. 4), and the cinema system is defined to include information used when capturing a moving image in a file name (see FIG. 5). Thus, in the DCF, it is possible to manage an image file while ensuring compatibility with other devices following the DCF standard, whereas, in the cinema system, it is possible to manage an image file to identify various kinds of information, such as a device used for capturing a moving image, from a file name or the like.

In the present embodiment, the digital camera 100 further comprises the display monitor 130 (display) that displays information. In response to the user operation, input in the operation interface 150, for selecting a file system from the DCF and the cinema system (S2), the controller 135 causes the display monitor 130 to display the file name and the folder name to be set when the image file is recorded in the folder corresponding to the selected file system (S4, S7). Thus, the user can select the file system, referring to the file name and the folder name of the image file to be recorded.

In the present embodiment, the digital camera 100 further comprises the display monitor 130 (display) that displays an image. The controller 135 causes the display monitor 130 to display an image indicated by either one or both of an image file recorded in the DCIM and an image file recorded in the PRIVATE (S14, S17, S19). As an example of displaying an image indicated by one of the image file recorded in the DCIM and the image file recorded in the PRIVATE, only the image file under the DCIM is displayed (S14) in the present embodiment. However, only an image indicated by the image file under the PRIVATE may be displayed.

In the present embodiment, the controller 135 receives a user operation input in the operation interface 150. The user operation is an operation selecting an order of displaying images from the shooting order (an order of capturing the images) or the file name order (an order defined by a file name), the images being indicated by each image file of both the image file recorded in the DCIM and the image file recorded in the PRIVATE. The controller 135 causes the display monitor 130 to display the images indicated by the each image file in the order selected (S15, S17, S19). Thus, even when the images indicated by both the image file recorded in the DCIM and the image file recorded in the PRIVATE are displayed, the images can be displayed in the order preferred by the user.

Second Embodiment

The first embodiment describes an example where the memory card 142 inserted into the digital camera 100 has a volume label following the cinema system. In a second embodiment, the digital camera 100 that changes the volume label of the memory card 142 in accordance with the file system will be described.

Hereinafter, the digital camera 100 according to the present embodiment will be described. Description of configurations and operations of the digital camera 100 similar to those in the first embodiment will be omitted as appropriate.

In a case where the cinema system is set in the setting of the file system and the volume label of the inserted memory card 142 does not follow the cinema system, the digital camera 100 according to the present embodiment changes the volume label so that the volume label follows the cinema system. The volume label of the cinema system for changing can be set by the user in the setting menu, for example.

Figure 14A:
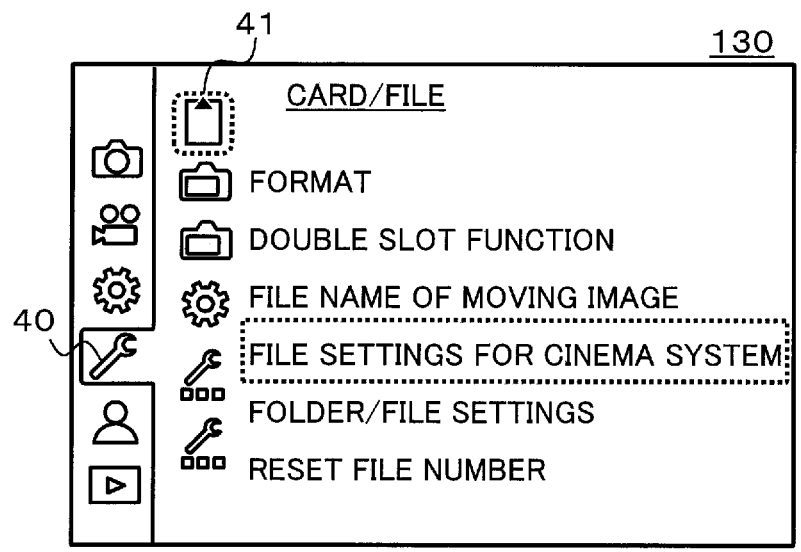
FIGS. 14A and 14B are explanatory views of an outline of an operation to set a volume label of a memory card in a digital camera according to a second embodiment.
Figure 14A:
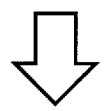
Figure 14B:
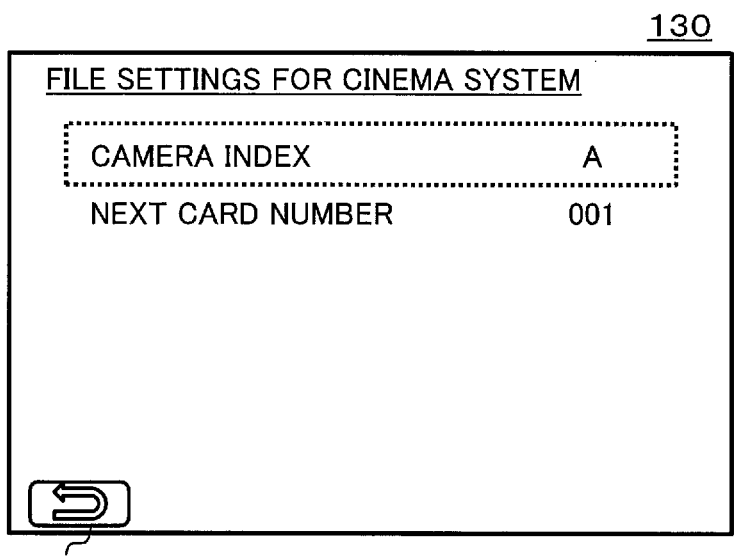

FIGS. 14A and 14B are explanatory views of an operation to set the volume label of the memory card 142 in the digital camera 100 according to the second embodiment. FIG. 14A illustrates a state in which the menu item "file settings for cinema system" is selected on a setting menu screen as in FIG. 6A. FIG. 14B illustrates a setting screen of the file settings for cinema system that transitions from FIG. 14A in response to the above selection. When the DCF is set in the setting of the "file name of moving image", the menu item "file settings for cinema system" may be grayed out, for example.

In the example of FIG. 14B, the display monitor 130 displays "camera index" and "next card number" as setting items of the file settings for cinema system and the return button 54. The setting items "camera index" and "next card number" are respectively for setting the camera index F1 and the card number F2 corresponding to the volume label in a file name in accordance with the cinema system (see FIG. 5B). The digital camera 100 accepts a user operation of inputting characters and numbers for each setting item, and holds the input values as setting values in the buffer memory 125, for example.

Figure 15:
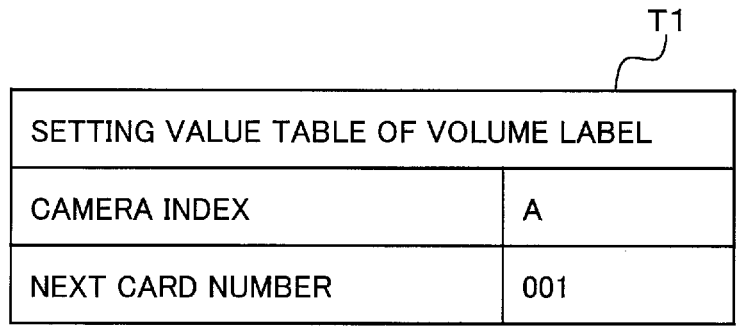
FIG. 15 shows a setting value table of a volume label.

FIG. 15 shows a setting value table T1 of the volume label. In the setting value table T1 of the volume label of FIG. 15, "A" and "001" are stored as the setting values input for the setting items "camera index" and "next card number", respectively.

An operation to change the volume label of the memory card 142 based on the setting in the setting menu described above will be described with reference to FIG. 16.

Figure 16:
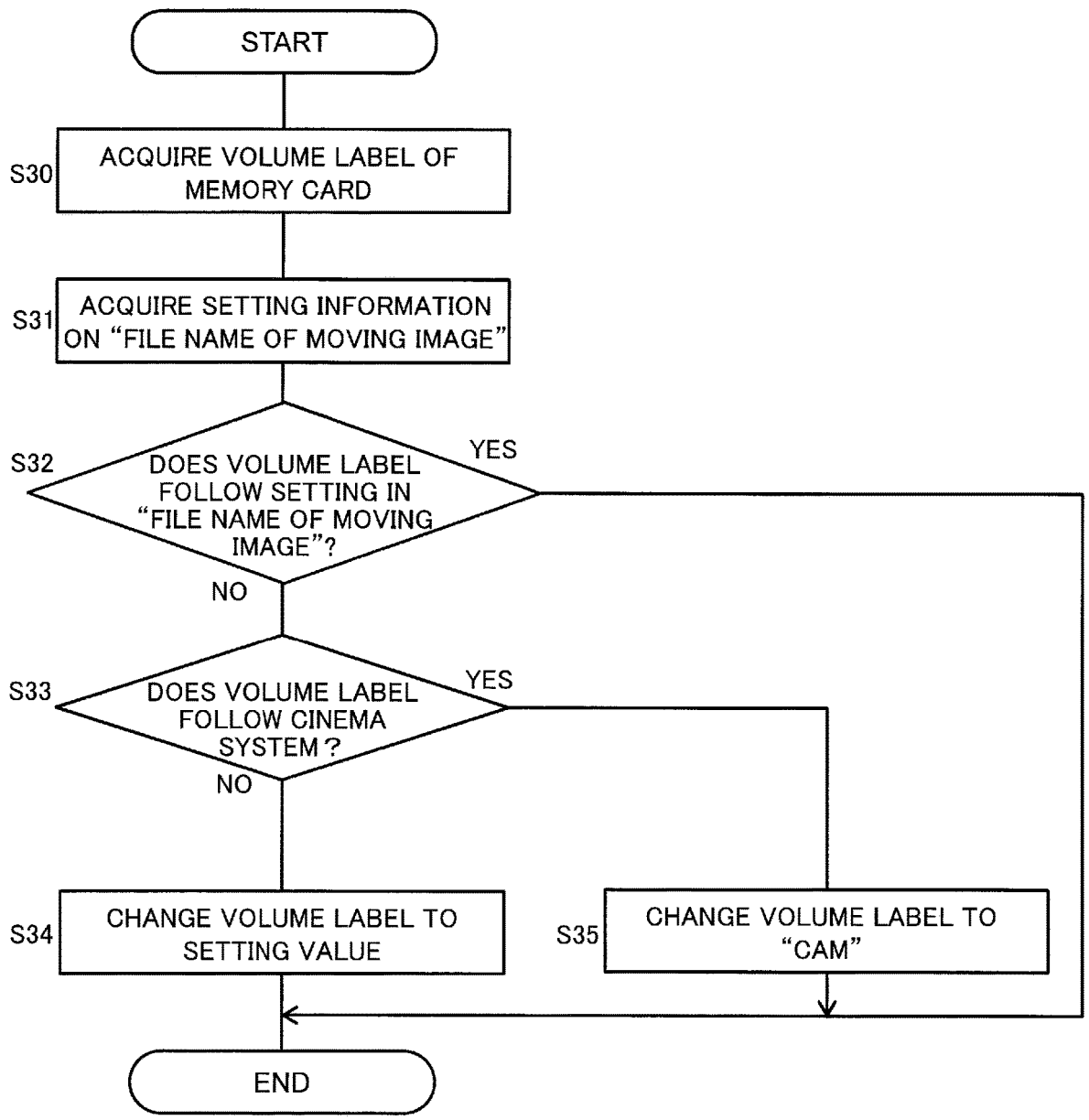
FIG. 16 is a flowchart showing an operation to change a volume label of a memory card in the digital camera according to the second embodiment.

FIG. 16 is a flowchart showing an operation to change the volume label of the memory card 142 in the digital camera 100 according to the second embodiment. Processing of this flowchart is started when a new memory card 142 is inserted into the card slot 140, and is performed by the controller 135, for example.

Hereinafter, an operation example of changing the volume label of the memory card 142 from the DCF to the cinema system or from the cinema system to the DCF will be described. In the digital camera 100, a predetermined value used as the volume label following the DCF is stored in advance in the flash memory 145 or the like, and the predetermined value is "CAM".

In the flowchart of FIG. 16, the controller 135 first acquires the volume label of the inserted memory card 142 through the card slot 140 (S30).

The controller 135 also acquires setting information indicating the file system set in the digital camera 100 (S31). For example, the setting information is determined in advance in the setting menu of the file name of a moving image (see FIG. 6), and is stored in the buffer memory 125 or the like.

Next, the controller 135 determines, for example, whether or not the acquired volume label of the memory card 142 matches the setting of the file name of a moving image in the acquired setting information, i.e., whether or not the volume label matches the set file system (S32).

When the acquired volume label does not match the setting of the file name of a moving image (NO in S32), the controller 135 determines whether or not the acquired volume label conforms to the cinema system (S33), for example. For example, when the volume label of the memory card 142 is the predetermined value of the DCF system while the cinema system is being set in the setting of the file name of a moving image (NO in S32), the determination in step S33 is NO.

When it is determined that the acquired volume label does not follow the cinema system (NO in S33), the controller 135 refers to the setting value table T1 of the volume label and changes the volume label of the memory card 142 to a setting value (S34), for example. In the example of FIG. 15, the volume label of the memory card 142 is changed from the predetermined value "CAM" to "A001".

Meanwhile, when the acquired volume label conforms to the cinema system (YES in S33), the controller 135 changes the volume label of the memory card 142 to the predetermined value of the DCF (S35).

After changing the volume label of the memory card 142 (S34, S35), the controller 135 terminates the processing of this flowchart. Further, when the volume label matches the setting of the file name of a moving image (YES in S32), the controller 135 terminates the processing of this flowchart without particularly changing the volume label of the memory card 142.

According to the above processing, when the file system based on the setting of the file name of a moving image does not match the file system which the volume label of the memory card 142 follows (NO in S32), the operation of changing a volume label is performed (S34, S35). Thus, the volume label following the file system to be used for recording a moving image file can be given to the memory card 142 in accordance with the setting of the file name of a moving image.

The operation of changing a volume label in FIG. 16 may be started not only when a new memory card 142 is inserted, but also when the setting of the file name of a moving image is changed by the operation of setting a file system (FIG. 7) while the memory card 142 is being inserted, for example. In this case, in step S31, the controller 135 acquires setting information in response to a user operation of determining the file system, for example. The operation of changing a volume label may also be started when capturing of a moving image file is started. In this case, the controller 135 acquires setting information in step S31 at the start of recording a moving image.

As described above, in the digital camera 100 according to the present embodiment, the controller 135 sets the volume label of the memory card 142 in accordance with the file system selected by the user operation (S30 to S35). This makes it possible to set the volume label following the file system according to the user's preference, thereby facilitating management of an image file to be stored in the memory card 142.

Third Embodiment

The second embodiment describes an operation example where the digital camera 100 changes the volume label of the memory card 142 in accordance with the set file system.

In a third embodiment, there will be described the digital camera 100 that performs an gathering operation for integrally managing moving image files in the memory card 142 in accordance with the set file system.

Hereinafter, the digital camera 100 according to the present embodiment will be described. Description of configurations and operations of the digital camera 100 similar to those in the first and second embodiments will be omitted as appropriate.

Figure 17B:
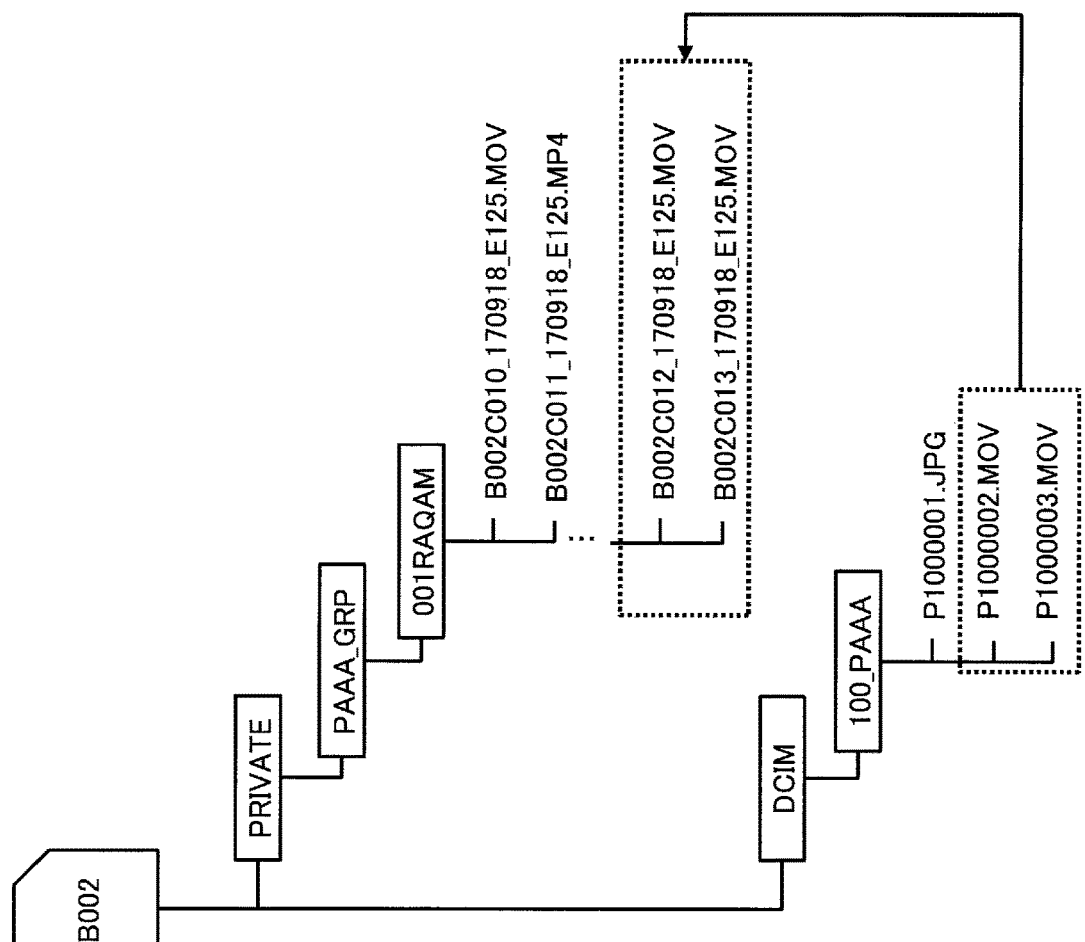
FIGS. 17A and 17B are explanatory views of an outline of an operation to gather a moving image file in a digital camera according to a third embodiment.
Figure 17A:
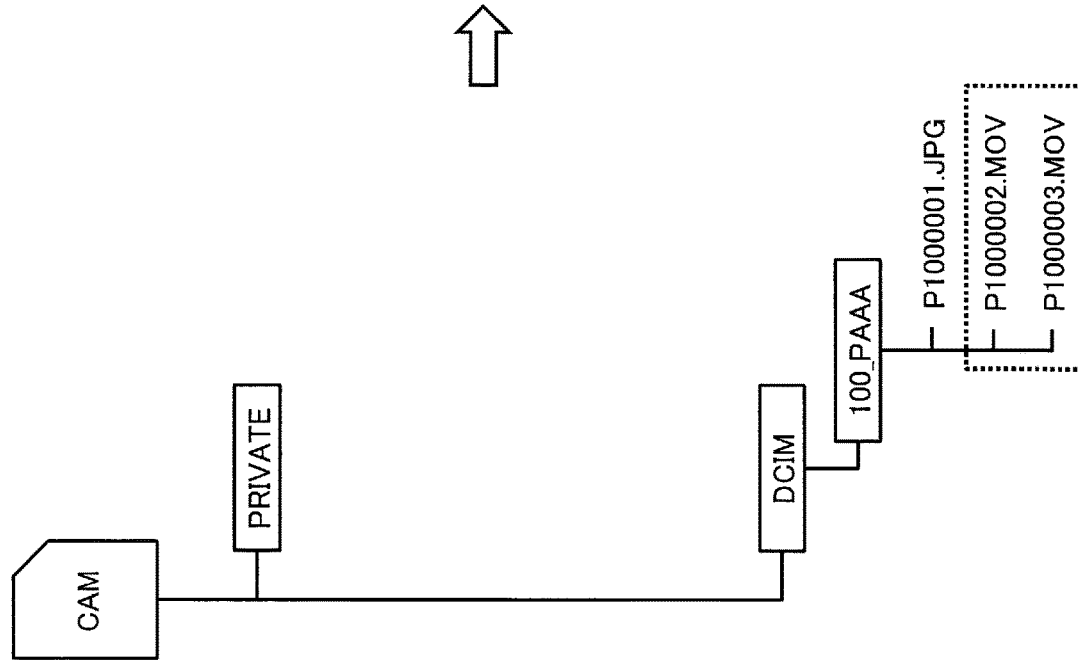

FIGS. 17A and 17B are explanatory views of an operation of gathering a moving image file in the digital camera 100 according to the third embodiment. FIG. 17A illustrates a folder configuration of the memory card 142 in which moving image files are recorded according to the DCF. FIG. 17B illustrates a state in which the gathering operation is performed in the state of FIG. 17A in the digital camera 100 with the cinema system set.

When a moving image file according to a file system different from the set file system is present in the memory card 142, the digital camera 100 according to the present embodiment performs the gathering operation such as copying a moving image file in accordance with the set file system. In FIG. 17A, moving image files of the DCF are present under the DCIM. In FIG. 17B, the moving image files are copied to a folder under the PRIVATE in accordance with the cinema system.

In the present embodiment, when recording a moving image file according to the DCF, the digital camera 100 records, as meta-information in the moving image file, information including a setting for shooting a moving image such as moving image quality, the volume label of the memory card 142, and an shooting date/time. The meta-information is used for the gathering operation from the DCF to the cinema system.

Figure 18:
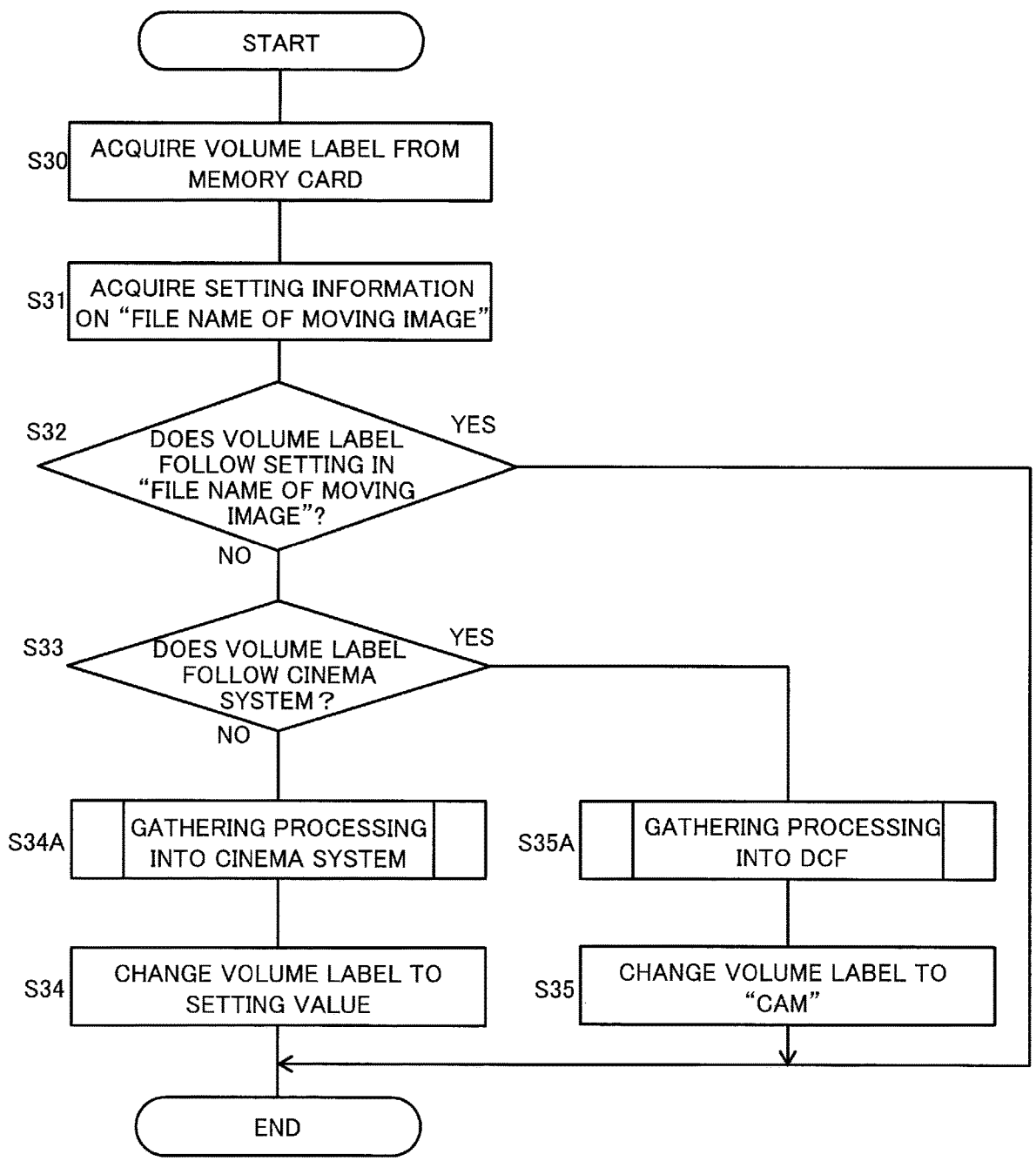
FIG. 18 is a flowchart showing an operation to gather a moving image file in the digital camera according to the third embodiment.

FIG. 18 is a flowchart showing an operation of gathering a moving image file in the digital camera 100 according to the present embodiment. In the digital camera 100 according to the present embodiment, the controller 135 performs, in addition to processing in steps S30 to S35 in a similar manner to the operation of changing a volume label (FIG. 16) in the second embodiment, performs processing for the gathering operation (S34A, S35A), for example.

For example, the controller 135 determines whether or not the volume label acquired in step S30 follows the file system in the setting information acquired in step S31 (S32). In the present embodiment, the determination in step S32 is performed to detect whether or not a moving image file according to a file system that does not follow the setting in the digital camera 100 is present in the memory card 142.

Figure 19:
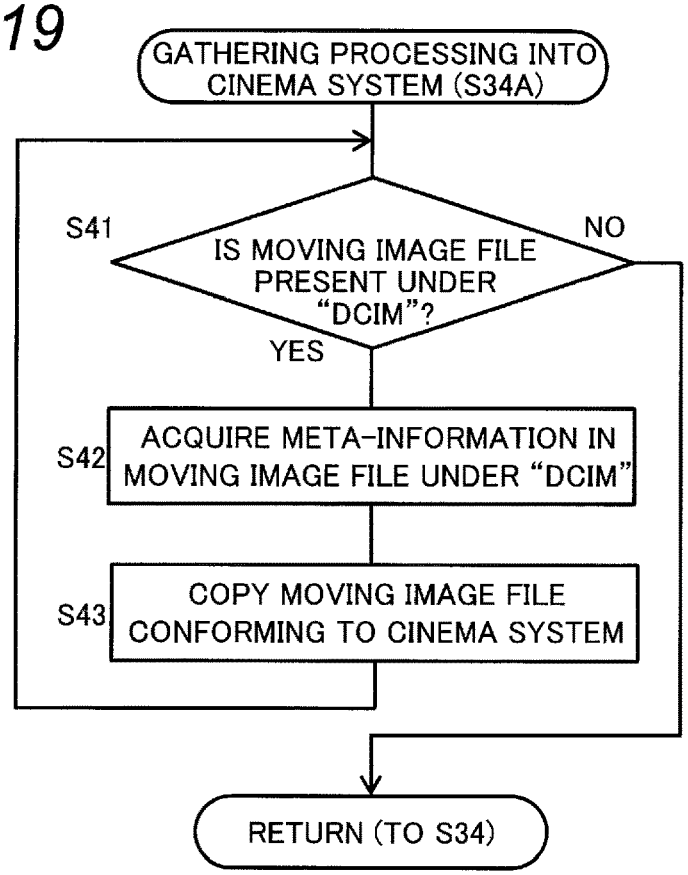
FIG. 19 is a flowchart showing gathering processing into a cinema system.

When the volume label of the memory card 142 does not follow the file system set in the digital camera 100 (NO in S32), the controller 135 performs the processing of gathering the moving image file to the cinema system or the DCF (S34A, S35A), as a result of detecting the moving image file not following the file system. For example, when it is determined that the volume label does not follow the cinema system (NO in S33), the controller 135 performs the gathering processing into the cinema system (S34A). FIG. 19 illustrates an example of the processing in step S34A.

In the gathering processing into the cinema system in FIG. 19 (S34A), the controller 135 determines whether or not a moving image file is present under the DCIM (S41).

When a moving image file is present under the DCIM (YES in S41), the controller 135 acquires meta-information recorded at the time of recording the moving image file (S42).

Then, the controller 135 copies the moving image file under the DCIM in accordance with the cinema system (S43). At this processing, the controller 135 determines, by using the acquired meta-information, a recording folder according to the cinema system and a file name of the moving image file.

In the example of FIG. 17, in step S43 a moving image file "P1000002.MOV" under the DCIM is copied to a folder under the PRIVATE in accordance with the cinema system. At this processing, as illustrated in FIG. 17B, the copied moving image file is recorded as "B002C012_170918_E125.MOV" in a folder "001RAQAM". The controller 135 repeats the processing from step S41 until no more uncopied moving image file is present under the DCIM (NO in S41).

Returning to FIG. 18, after performing the gathering processing into the cinema system (S34A), the controller 135 changes the volume label of the memory card 142 to the setting value of the cinema system (S34).

Figure 20:
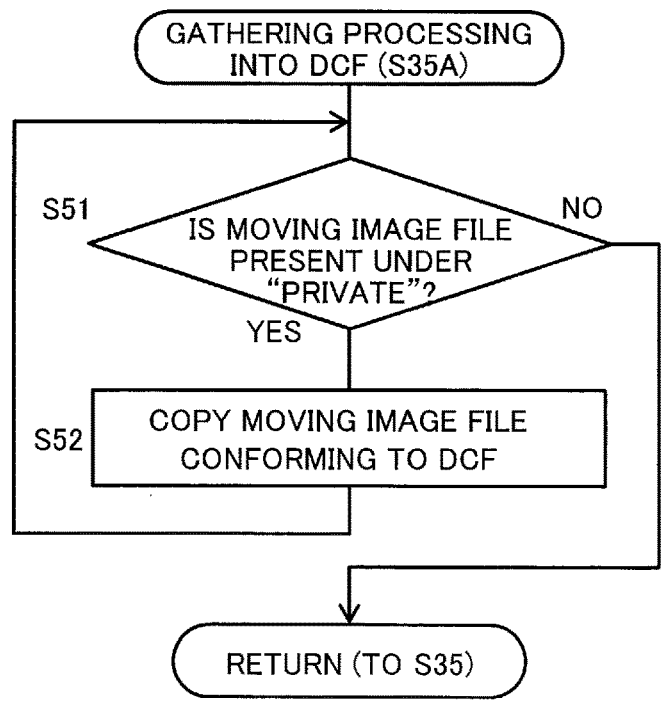
FIG. 20 is a flowchart showing gathering processing into a DCF.

Meanwhile, when the controller 135 determines that the volume label follows the cinema system in step S33 (YES in S33), the controller 135 performs the gathering processing into the DCF (S35A), for example. FIG. 20 illustrates an example of the processing in step S35A.

In the gathering processing into the DCF in FIG. 20 (S35A), the controller 135 determines whether or not a moving image file is present under the PRIVATE (S51).

When the moving image file is present under the PRIVATE (YES in S51), the controller 135 copies the moving image file under the PRIVATE to a folder under the DCIM in accordance with the DCF (S52), for example. The controller 135 repeats the processing in steps S51 and S52 to copy all moving image files under the PRIVATE.

Returning to FIG. 18, after executing the gathering processing into the DCF (S35A), the controller 135 changes the volume label of the memory card 142 to the predetermined value of the DCF (S35).

According to the above processing, when a moving image file is recorded in the memory card 142 according to a file system different from that in the setting of the file name of a moving image, gathering processing of the moving image file is performed in accordance with the set file system (S34A, S35A). Thus, it is possible to facilitate management of the moving image file, integrating into the file system selected by the user. In this case, in a playback operation of a moving image file, it is only necessary to refer to a recording folder according to one file system, for example. Therefore, the playback operation can be performed more efficiently than by referring to recording folders according to both file systems.

In the present embodiment, whether or not to perform processing in and after step S33 including the gathering processing of the moving image file is determined based on whether or not the volume label follows the file system in the setting of the file name of a moving image (S32). Thus, it is possible to determine whether to perform the gathering processing of the moving image file and other processing at a higher speed, as compared to a case of referring to presence or absence of a moving image file that does not follow the set file system.

The gathering processing of the moving image file (S34A, S35A) may be implemented not only by copying the moving image file, but also by moving the moving image file or creating a link file in accordance with the set file system. For example, the controller 135 may move the moving image file by deleting the moving image file in a copy source after step S43 or S52. Further, in step S43 or S52, a link file may be stored in a folder to which the moving image file is copied.

In the above description of step S32, there is described the example where whether or not a moving image file according to the file system that does not follow the setting in the digital camera 100 exists is detected based on the volume label. The detection in step S32 is not limited thereto, and may be performed by determining whether or not a moving image file recorded according to each file system is present as in step S41 in FIG. 19 or step S51 in FIG. 20, for example.

As described above, in the digital camera 100 according to the present embodiment, when detecting, in the memory card 142, an image file present in a folder that does not correspond to the file system selected by the user operation among the DCIM and PRIVATE (NO in S32), the controller 135 gathers the detected image file into a folder that corresponds the file system selected by the user operation among the DCIM and PRIVATE (the first and second folders) in the memory card 142 (S34A, S35A). This makes it possible to, when the user uses the digital camera switching the file system, facilitate managing an image file according to the selected file system, for example.

Further, in the present embodiment, the controller 135 detects whether or not an image file is present in the folder that does not correspond to the file system selected by the user operation based on the volume label of the memory card 142 (S32). This makes it possible to detect presence or absence of an image file stored in the folder that does not follow the selected file system, without referring to the folder that does not correspond to the file system selected.

Fourth Embodiment

The third embodiment describes the digital camera 100 that performs the operation of gathering an image file, in the memory card 142, in accordance with the file system. In a fourth embodiment, the digital camera 100 capable of formatting the memory card 142 will be described.

Hereinafter, the digital camera 100 according to the present embodiment will be described. Description of configurations and operations of the digital camera 100 similar to those in the first to third embodiments will be omitted as appropriate.

Figure 21:
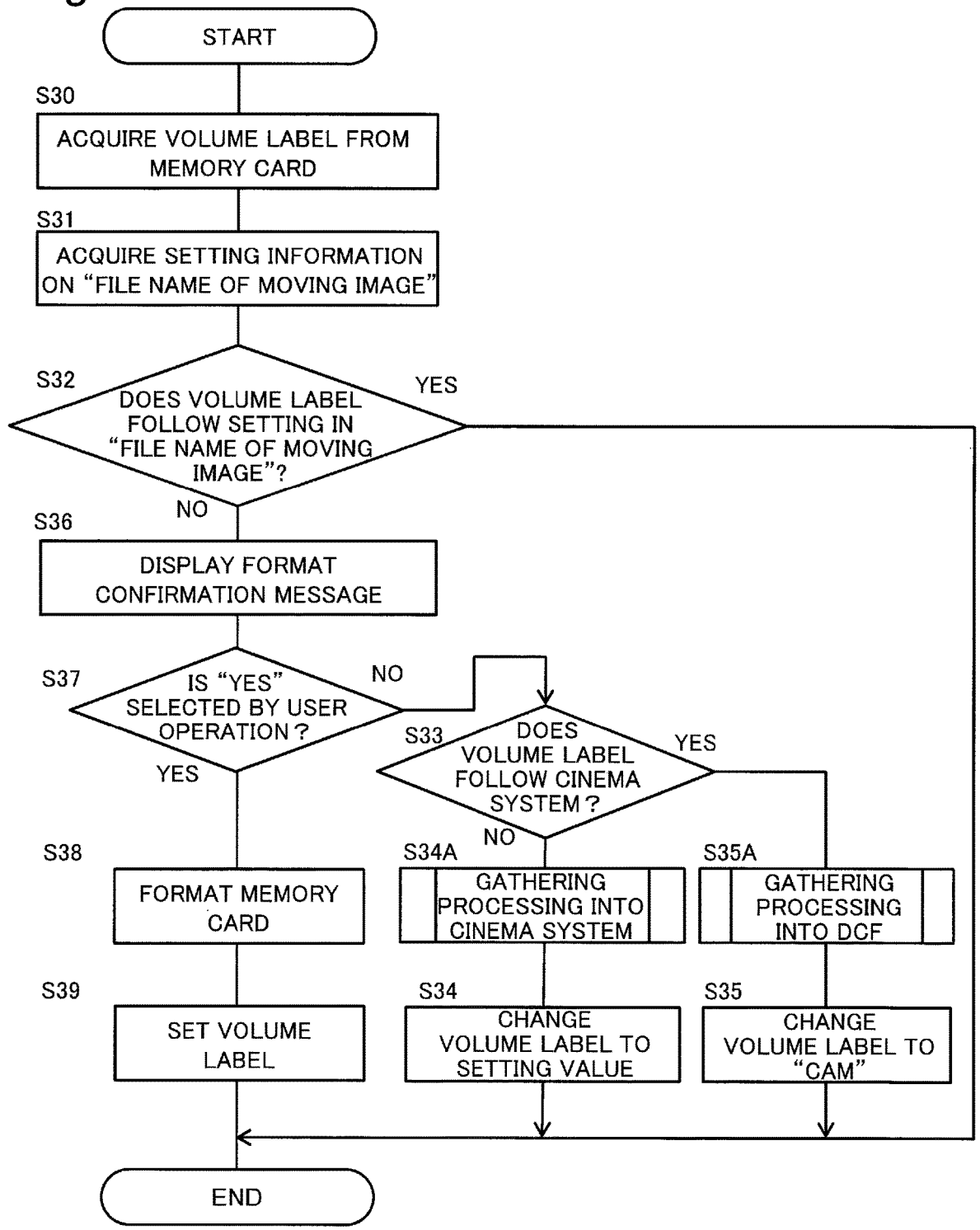
FIG. 21 is a flowchart showing an operation to format a memory card in a digital camera according to a fourth embodiment.

FIG. 21 is a flowchart showing an operation of formatting the memory card 142 in the digital camera 100 according to the fourth embodiment. In the digital camera 100 according to the present embodiment, the controller 135 performs the processing in steps S30 to S35 in a similar manner to those in the third embodiment, and, in addition, performs formatting processing (S36 to S39), for example.

Figure 22:
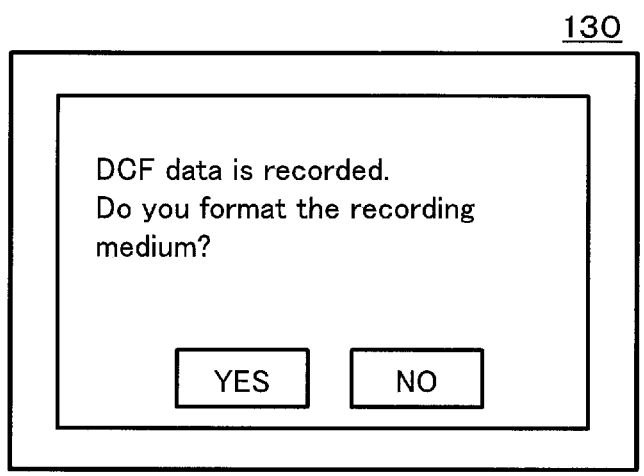
FIG. 22 illustrates a display example in a format operation.

In the present embodiment, when determining that the volume label of the memory card 142 does not follow the file system set in the digital camera 100 (NO in S32), the controller 135 causes the display monitor 130 to display a predetermined confirmation screen (S36), for example. FIG. 22 illustrates a display example in step S36.

The confirmation screen in step S36 is displayed to allow the user to select whether or not to format the memory card 142. FIG. 22 illustrates a display example in the formatting operation performed when the memory card 142 with a moving image file of the DCF recorded is inserted, while the cinema system is set in the setting of the file name of a moving image in the digital camera 100. When the above confirmation screen is displayed, a user operation of selecting "Yes" or "No" can be input to the digital camera 100 (S37).

When "Yes" is selected by the user operation (YES in S37), the controller 135 formats, i.e., initializes the memory card 142 in accordance with the set file system (S38). In the example of FIG. 21, a moving image file recorded under the DCIM according to the DCF is deleted. When folders such as the PRIVATE or PAAA_GRP are not present, those folders may be created.

Next, the controller 135 sets the volume label of the memory card 142 in accordance with the set file system (S38), and terminates the processing of this flowchart, for example. The processing in step S38 is performed in a similar manner to that in step S34 or S35, for example.

Meanwhile, when "NO" is selected by the user operation on the message screen illustrated in FIG. 22 (NO in S64), the controller 135 performs the processing from step S33 as in the third embodiment, for example.

According to the above processing, when the volume label of the memory card 142 does not follow the file system in the setting of the file name of a moving image (NO in S32), the user can select whether or not to format the memory card 142 (S37). For example, the user can back up moving image files recorded in the memory card 142 to another recording medium in advance and then select formatting. Therefore, the user can easily and integrally manage the moving image files in accordance with the set file system. Even when the user does not select formatting (NO in S37), the moving image files can be easily managed by performing the operation of gathering the moving image files, for example.

As described above, in the digital camera 100 according to the present embodiment, when detecting, in the memory card 142, an image file present in a folder that does not correspond to the file system selected by the user operation among the DCIM and PRIVATE (NO in S32), the controller 135 formats the memory card 142 in accordance with the file system selected by the user operation (S38). For example, in a case where a single memory card 142 is shared by a plurality of digital cameras 100, image files can be easily managed in accordance with the file system set in each digital camera 100.

Other Embodiments

As described above, the first to fourth embodiments have been described as examples of the technique disclosed in the present application. However, the technique in the present disclosure is not limited thereto, and is also applicable to embodiments in which changes, substitutions, additions, omissions, and the like are made as appropriate. It is also possible to form a new embodiment by combining the components described in the above embodiments.

The above second embodiment describes an example of changing the volume label of the memory card 142 from the DCF to the cinema system (S34) and from the cinema system to the DCF (S35). However, the operation of changing the volume label is not particularly limited thereto. For example, only the change from the DCF to the cinema system (S34) may be performed, and the volume label of the cinema system may not be particularly changed.

In each of the above embodiments, the DCF and the cinema system are exemplified as examples of the first and second file systems in the digital camera 100. In the present embodiment, the first and second file systems are not limited thereto, and may be various file systems that manage an image file by defining at least one of a file name, a folder configuration, and a folder name. For example, the second file system may be a file system other than the cinema system, such as a file system for managing both a still image file and a moving image file. According to this file system, the controller 135 sets at least one of a file name of an image file to be stored in a recording medium, a folder configuration of a folder to store the image file, and a folder name thereof.

Further, each of the above embodiments describe an example where a still image file is stored under the DCIM of the memory card 142, regardless of the file system selected by the user operation. In the present embodiment, a folder to store the still image file may be switched in accordance with the file system selected by the user operation as in a case of a moving image file, for example.

Further, the above third embodiment describes the digital camera 100 that performs the operation of gathering a moving image file. In the present embodiment, a target image file for the gathering operation is not limited to a moving image file, and may include a still image file, for example.

Further, the above fourth embodiment describes an example where, when an option of formatting the memory card 142 is not selected by a user operation (NO in S37), the processing from step S33 in FIG. 18 is executed to perform the gathering operation. In the present embodiment, the gathering operation may not be performed in a case of NO in step S37, and a recorded moving image file or the like may be maintained without any change, for example.

Further, each of the above embodiments describes the digital camera 100 that records an image file on the memory card 142 as an example of the recording medium. The digital camera 100 according to the present embodiment may record an image file not only on the memory card 142 but also on an external recording device such as a solid state drive (SSD) as a recording medium.

Further, each of the above embodiments exemplifies the digital camera 100 including the optical system 110 and the lens driver. The imaging apparatus according to the present embodiment does not need to include the optical system 110 or the lens driver, and may be an interchangeable-lens camera, for example.

Further, in each of the above embodiments, the digital camera 100 is described as an example of the imaging apparatus, but the present disclosure is not limited thereto. The imaging apparatus of the present disclosure may be electronic devices (e.g., a video camera, a smartphone, and a tablet computer) having an image capturing function.

As described above, the embodiments have been described as examples of the technique in the present disclosure. For this purpose, the accompanying drawings and the detailed description are provided.

Thus, in order to describe the above technique, the components described in the accompanying drawings and the detailed description may include not only components essential for solving the problem, but also components not essential for solving the problem. Therefore, those non-essential components should not be immediately recognized to be essential just because those non-essential components are described in the accompanying drawings and the detailed description.

The present disclosure is applicable to an imaging apparatus that records an image file on a recording medium.

The invention claimed is:

1. An imaging apparatus that records an image file on a recording medium, the imaging apparatus comprising:
  an imager that captures a subject image to generate image data;
  a controller that records an image file based on the image data on the recording medium;
  an operation interface that inputs a user operation for selecting a file system from first and second file systems different from each other, the file system managing the image file in the recording medium; and
  a display that displays an image, wherein
  in accordance with the user operation input in the operation interface, the controller switches a folder for storing the image file between a first folder corresponding to the first file system and a second folder corresponding to the second file system in the recording medium, wherein
  when image capturing is performed with the first file system selected by the user operation, a still image file and a moving image file are stored in the first folder,
  when image capturing is performed with the second file system selected by the user operation, a still image file is stored in the first folder and a moving image file is stored in the second folder, wherein
  the controller
  receives a user operation input in the operation interface, the user operation setting an order of displaying images, the images being indicated by image files stored in respective folders among both the first and second folder, and
  causes the display to display the images indicated by respective image files in both the first and second folders in the order set based on the user operation setting the order input in the operation interface.

2. The imaging apparatus according to claim 1, wherein the controller sets at least one of a file name of the image file to be recorded on the recording medium, a folder configuration or a folder name in the folder for storing the image file, in accordance with the file system selected by the user operation from the first and second file systems.

3. The imaging apparatus according to claim 1, wherein the controller records a moving image file based on the image data in a folder corresponding to the file system selected from the first and second folders, depending on the user operation input in the operation interface, and records a still image file based on the image data in the first folder, without depending on the user operation input in the operation interface.

4. The imaging apparatus according to claim 3, wherein:
  the first file system is defined by a Design rule for Camera File system (DCF) standard; and
  the second file system is defined to include information used when capturing a moving image in a file name.

5. The imaging apparatus according to claim 1, wherein in response to the user operation, input in the operation interface, for selecting a file system from the first and second file systems, the controller causes the display to display a file name and a folder name to be set when the image file is recorded in a folder corresponding to the selected file system.

6. The imaging apparatus according to claim 1, wherein the controller causes the display to display an image indicated by either one or both of an image file recorded in the first folder and an image file recorded in the second folder.

7. The imaging apparatus according to claim 1, wherein the controller sets a volume label of the recording medium in accordance with the file system selected by the user operation.

8. The imaging apparatus according to claim 1, wherein the user operation setting the order is a user operation selecting one order to be set from an order of capturing the images or an order defined by a file name of respective image files in both the first and second folders.

9. An imaging apparatus that records an image file on a recording medium, the imaging apparatus comprising: an imager that captures a subject image to generate image data; a controller that records an image file based on the image data on the recording medium; and an operation interface that inputs a user operation for selecting a file system from first and second file systems different from each other, the file system managing the image file in the recording medium, wherein in accordance with the user operation input in the operation interface, the controller switches a folder for storing the image file between a first folder corresponding to the first file system and a second folder corresponding to the second file system in the recording medium, wherein when detecting, in the recording medium, an image file present in an unselected folder among the first and second folders, the unselected folder not corresponding to the file system selected by the user operation, the controller gathers the detected image file into a selected folder among the first and second folders in the recording medium by copying or moving the detected image file, or creating a link to the detected image file, the selected folder.

10. The imaging apparatus according to claim 9, wherein the controller detects whether or not an image file is present in a folder that does not correspond to the file system selected by the user operation based on a volume label of the recording medium.

11. An imaging apparatus that records an image file on a recording medium, the imaging apparatus comprising:
an imager that captures a subject image to generate image data;
a controller that records an image file based on the image data on the recording medium; and
an operation interface that inputs a user operation for selecting a file system from first and second file systems different from each other, the file system managing the image file in the recording medium, wherein
in accordance with the user operation input in the operation interface, the controller switches a folder for storing the image file between a first folder corresponding to the first file system and a second folder corresponding to the second file system in the recording medium, wherein
when detecting, in the recording medium, an image file present in an unselected folder among the first and second folders, the unselected folder not corresponding to the file system selected by the user operation,
the controller initializes the recording medium by formatting the recording medium in accordance with the file system selected by the user operation.

* * * * *